US012100181B2

(12) United States Patent
Zhou et al.

(10) Patent No.: US 12,100,181 B2
(45) Date of Patent: Sep. 24, 2024

(54) COMPUTATIONALLY EFFICIENT METHOD FOR COMPUTING A COMPOSITE REPRESENTATION OF A 3D ENVIRONMENT

(71) Applicant: Magic Leap, Inc., Plantation, FL (US)

(72) Inventors: Lipu Zhou, Sunnyvale, CA (US); Frank Thomas Steinbruecker, Mountain View, CA (US); Ashwin Swaminathan, Dublin, CA (US); Hui Ju, Mountain House, CA (US); Daniel Esteban Koppel, San Jose, CA (US); Konstantinos Zampogiannis, San Jose, CA (US); Pooja Piyush Mehta, Santa Clara, CA (US); Vinayram Balakumar, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 495 days.

(21) Appl. No.: 17/315,741

(22) Filed: May 10, 2021

(65) Prior Publication Data
US 2021/0358173 A1 Nov. 18, 2021

Related U.S. Application Data

(60) Provisional application No. 63/023,089, filed on May 11, 2020.

(51) Int. Cl.
*G06T 7/73* (2017.01)
*G06F 17/16* (2006.01)
(Continued)

(52) U.S. Cl.
CPC ............... *G06T 7/97* (2017.01); *G06F 17/16* (2013.01); *G06F 17/175* (2013.01); *G06T 7/70* (2017.01)

(58) Field of Classification Search
CPC .... G06T 7/55; G06T 7/70; G06T 7/73; G06T 7/97; G06T 2207/10028; G06T 2207/30244; G06F 17/16; G06F 17/175
See application file for complete search history.

(56) References Cited

U.S. PATENT DOCUMENTS

| 4,767,923 A | 8/1988 | Yuasa |
| 4,797,544 A | 1/1989 | Montgomery et al. |

(Continued)

FOREIGN PATENT DOCUMENTS

| CN | 101908219 A | 12/2010 |
| CN | 104599284 A | 5/2015 |

(Continued)

OTHER PUBLICATIONS

Sebastian Thrun, The GraphSLAM Algorithm with Applications to Large-Scale Mapping of Urban Structures, May-Jun. 2006, SAGE Publications, vol. 25, No. 5-6, pp. 403-429. (Year: 2006).*

(Continued)

*Primary Examiner* — Siamak Harandi
*Assistant Examiner* — Mehrazul Islam
(74) *Attorney, Agent, or Firm* — Wolf, Greenfield & Sacks, P.C.

(57) ABSTRACT

Methods and apparatus for providing a representation of an environment, for example, in an XR system, and any suitable computer vision and robotics applications. A representation of an environment may include one or more planar features. The representation of the environment may be provided by jointly optimizing plane parameters of the planar features and sensor poses that the planar features are observed at. The joint optimization may be based on a reduced matrix and a reduced residual vector in lieu of the Jacobian matrix and the original residual vector.

20 Claims, 11 Drawing Sheets

(51) Int. Cl.
    *G06F 17/17* (2006.01)
    *G06T 7/00* (2017.01)
    *G06T 7/55* (2017.01)
    *G06T 7/70* (2017.01)

(56) References Cited

U.S. PATENT DOCUMENTS

| | | | |
|---|---|---|---|
| 4,804,949 A | 2/1989 | Faulkerson | |
| 4,906,843 A | 3/1990 | Jones et al. | |
| 5,355,146 A | 10/1994 | Chiu et al. | |
| 5,574,804 A | 11/1996 | Olschafskie et al. | |
| 5,578,813 A | 11/1996 | Allen et al. | |
| 5,611,033 A | 3/1997 | Pitteloud et al. | |
| 5,685,002 A | 11/1997 | Sano | |
| 5,880,740 A | 3/1999 | Halliday et al. | |
| 5,886,702 A | 3/1999 | Migdal et al. | |
| 5,909,209 A | 6/1999 | Dickinson | |
| 5,917,935 A | 6/1999 | Hawthorne et al. | |
| 5,994,710 A | 11/1999 | Knee et al. | |
| 6,005,681 A | 12/1999 | Pollard | |
| 6,047,132 A | 4/2000 | Maeda | |
| 6,075,905 A | 6/2000 | Herman et al. | |
| 6,078,701 A | 6/2000 | Hsu et al. | |
| 6,233,363 B1 | 5/2001 | Iida | |
| 6,249,360 B1 | 6/2001 | Pollard et al. | |
| 6,304,248 B1 | 10/2001 | Shiobara et al. | |
| 6,304,284 B1 | 10/2001 | Dunton et al. | |
| 6,344,846 B1 | 2/2002 | Hines | |
| 6,348,981 B1 | 2/2002 | Walsh | |
| 6,392,632 B1 | 5/2002 | Lee | |
| 6,429,422 B1 | 8/2002 | Bohn | |
| 6,445,411 B1 | 9/2002 | Shibata et al. | |
| 6,459,819 B1 | 10/2002 | Nakao | |
| 6,513,717 B2 | 2/2003 | Hannigan | |
| 6,525,306 B1 | 2/2003 | Bohn | |
| 6,648,483 B1 | 11/2003 | Kuo | |
| 6,657,667 B1 | 12/2003 | Anderson | |
| 6,710,768 B2 | 3/2004 | Muranami | |
| 6,711,293 B1 | 3/2004 | Lowe | |
| 6,783,069 B1 | 8/2004 | Hecht et al. | |
| 6,901,166 B1 | 5/2005 | Nakayama | |
| 6,965,460 B1 | 11/2005 | Gann et al. | |
| 6,982,764 B1 | 1/2006 | Heath | |
| 7,038,664 B2 | 5/2006 | Danzyger et al. | |
| 7,075,572 B2 | 7/2006 | Kinjo | |
| 7,103,211 B1 | 9/2006 | Medioni et al. | |
| 7,119,816 B2 | 10/2006 | Zhang et al. | |
| 7,123,292 B1 | 10/2006 | Seeger et al. | |
| 7,133,068 B2 | 11/2006 | Fisher et al. | |
| 7,221,810 B2 | 5/2007 | Andreasson et al. | |
| 7,280,109 B2 | 10/2007 | Hoppe | |
| 7,317,448 B1 | 1/2008 | Sasselli et al. | |
| 7,424,218 B2 | 9/2008 | Baudisch et al. | |
| 7,439,954 B2 | 10/2008 | Theytaz et al. | |
| 7,474,767 B2 | 1/2009 | Sen et al. | |
| 7,518,767 B2 | 4/2009 | Chen et al. | |
| 7,796,304 B2 | 9/2010 | Silverbrook | |
| 7,855,812 B2 | 12/2010 | Gelsomini et al. | |
| 7,884,970 B2 | 2/2011 | Hiroyasu et al. | |
| 7,957,009 B2 | 6/2011 | Silverbrook | |
| 7,961,364 B2 | 6/2011 | Lapstun et al. | |
| 8,106,886 B2 | 1/2012 | Chang | |
| 8,120,820 B2 | 2/2012 | Lapstun et al. | |
| 8,131,113 B1 | 3/2012 | Jin | |
| 8,179,563 B2 | 5/2012 | King et al. | |
| 8,189,965 B2 | 5/2012 | Edgar et al. | |
| 8,218,020 B2 | 7/2012 | Tenchio et al. | |
| 8,243,123 B1 | 8/2012 | Geshwind et al. | |
| 8,259,161 B1 | 9/2012 | Huang et al. | |
| 8,331,723 B2 | 12/2012 | Ozluturk | |
| 8,339,467 B2 | 12/2012 | Zahnert et al. | |
| 8,380,005 B1 | 2/2013 | Jonsson et al. | |
| 8,384,947 B2 | 2/2013 | Edgar et al. | |
| 8,416,468 B2 | 4/2013 | Underwood et al. | |
| 8,433,143 B1 | 4/2013 | Carson et al. | |
| 8,441,695 B2 | 5/2013 | Zahnert et al. | |
| 8,441,696 B2 | 5/2013 | Zahnert et al. | |
| 8,477,394 B2 | 7/2013 | Jonsson et al. | |
| 8,570,588 B2 | 10/2013 | Edgar et al. | |
| 8,582,182 B2 | 11/2013 | Zahnert et al. | |
| 8,655,094 B2 | 2/2014 | Miller et al. | |
| 8,659,596 B2 | 2/2014 | Corazza et al. | |
| 8,693,047 B2 | 4/2014 | Edgar et al. | |
| 8,723,885 B2 | 5/2014 | Zahnert et al. | |
| 8,786,897 B2 | 7/2014 | Edgar et al. | |
| 8,904,479 B1 | 12/2014 | Johansson et al. | |
| 8,982,122 B2 | 3/2015 | Corazza et al. | |
| 9,270,857 B2 | 2/2016 | Edgar et al. | |
| 9,300,834 B2 | 3/2016 | Zahnert et al. | |
| 9,465,129 B1 | 10/2016 | Olsson et al. | |
| 9,723,203 B1 | 8/2017 | Ettinger | |
| 9,912,847 B1 | 3/2018 | Yuan et al. | |
| 10,142,522 B2 | 11/2018 | Ilic | |
| 10,225,428 B2 | 3/2019 | Zahnert et al. | |
| 10,298,898 B2 | 5/2019 | Ilic et al. | |
| 10,375,279 B2 | 8/2019 | Ilic | |
| 10,410,321 B2 | 9/2019 | Ilic et al. | |
| 10,445,772 B1 | 10/2019 | Chau | |
| 10,455,128 B2 | 10/2019 | Ilic | |
| 10,484,561 B2 | 11/2019 | Ilic et al. | |
| 10,636,219 B2 | 4/2020 | Steinbrucker et al. | |
| 10,708,491 B2 | 7/2020 | Ilic et al. | |
| 10,841,551 B2 | 11/2020 | Ilic et al. | |
| 10,950,034 B1* | 3/2021 | Garcia | G06T 7/11 |
| 11,115,565 B2 | 9/2021 | Ilic | |
| 11,245,806 B2 | 2/2022 | Ilic et al. | |
| 11,315,217 B2 | 4/2022 | Ilic et al. | |
| 2001/0022860 A1 | 9/2001 | Kitamura et al. | |
| 2001/0043738 A1 | 11/2001 | Sawhney et al. | |
| 2002/0001418 A1 | 1/2002 | Fahraeus et al. | |
| 2002/0030748 A1 | 3/2002 | Kitaguchi et al. | |
| 2002/0181762 A1 | 12/2002 | Silber | |
| 2002/0190953 A1 | 12/2002 | Gordon et al. | |
| 2003/0174773 A1 | 9/2003 | Comaniciu et al. | |
| 2004/0028295 A1 | 2/2004 | Allen et al. | |
| 2004/0041804 A1 | 3/2004 | Ives et al. | |
| 2004/0085464 A1 | 5/2004 | Higurashi et al. | |
| 2004/0141157 A1 | 7/2004 | Ramachandran et al. | |
| 2004/0189674 A1 | 9/2004 | Zhang et al. | |
| 2004/0208369 A1 | 10/2004 | Nakayama | |
| 2004/0218055 A1 | 11/2004 | Yost et al. | |
| 2004/0239771 A1 | 12/2004 | Habe | |
| 2004/0264806 A1 | 12/2004 | Herley | |
| 2005/0013507 A1 | 1/2005 | Lee et al. | |
| 2005/0057510 A1 | 3/2005 | Baines et al. | |
| 2005/0129291 A1 | 6/2005 | Boshra | |
| 2005/0168614 A1 | 8/2005 | Okada et al. | |
| 2005/0212955 A1 | 9/2005 | Craig et al. | |
| 2005/0231482 A1 | 10/2005 | Theytaz et al. | |
| 2005/0231602 A1 | 10/2005 | Obrador et al. | |
| 2005/0248532 A1 | 11/2005 | Moon et al. | |
| 2005/0270483 A1 | 12/2005 | Fujimatsu et al. | |
| 2006/0003111 A1 | 1/2006 | Tseng | |
| 2006/0056731 A1 | 3/2006 | Bouk et al. | |
| 2006/0062427 A1 | 3/2006 | Burkhart et al. | |
| 2006/0067573 A1* | 3/2006 | Parr | G06F 18/00 382/154 |
| 2006/0170781 A1 | 8/2006 | Sobol | |
| 2007/0025723 A1 | 2/2007 | Baudisch et al. | |
| 2007/0031062 A1 | 2/2007 | Pal et al. | |
| 2007/0031063 A1 | 2/2007 | Zhou | |
| 2007/0076944 A1 | 4/2007 | Bryll et al. | |
| 2007/0121146 A1 | 5/2007 | Nesbit et al. | |
| 2007/0188490 A1 | 8/2007 | Kanai et al. | |
| 2007/0247459 A1 | 10/2007 | Li | |
| 2008/0101786 A1 | 5/2008 | Pozniansky et al. | |
| 2008/0130077 A1 | 6/2008 | Park et al. | |
| 2008/0168070 A1 | 7/2008 | Naphade et al. | |
| 2008/0215286 A1 | 9/2008 | Mealy et al. | |
| 2008/0219654 A1 | 9/2008 | Border et al. | |
| 2008/0260366 A1 | 10/2008 | Brosnan et al. | |
| 2009/0021576 A1 | 1/2009 | Linder et al. | |
| 2009/0032600 A1 | 2/2009 | Lapstun et al. | |
| 2009/0060283 A1 | 3/2009 | Bledsoe et al. | |

(56) References Cited

U.S. PATENT DOCUMENTS

| | | |
|---|---|---|
| 2009/0066693 A1 | 3/2009 | Carson |
| 2009/0080035 A1 | 3/2009 | Downs |
| 2009/0244648 A1 | 10/2009 | Chan et al. |
| 2010/0054627 A1 | 3/2010 | Rosenberg |
| 2010/0111441 A1 | 5/2010 | Xiong et al. |
| 2010/0123907 A1 | 5/2010 | Edgar et al. |
| 2010/0124384 A1 | 5/2010 | Edgar et al. |
| 2010/0149368 A1 | 6/2010 | Yamashita et al. |
| 2010/0174421 A1 | 7/2010 | Tsai et al. |
| 2010/0194919 A1 | 8/2010 | Ishii et al. |
| 2010/0201682 A1 | 8/2010 | Quan et al. |
| 2010/0208994 A1 | 8/2010 | Yao et al. |
| 2010/0245344 A1 | 9/2010 | Chen et al. |
| 2010/0295868 A1 | 11/2010 | Zahnert et al. |
| 2010/0296129 A1 | 11/2010 | Zahnert et al. |
| 2010/0296131 A1 | 11/2010 | Zahnert et al. |
| 2010/0296133 A1 | 11/2010 | Zahnert et al. |
| 2010/0296137 A1 | 11/2010 | Zahnert et al. |
| 2010/0296140 A1 | 11/2010 | Zahnert et al. |
| 2010/0315412 A1 | 12/2010 | Sinha et al. |
| 2011/0025842 A1 | 2/2011 | King et al. |
| 2011/0025853 A1 | 2/2011 | Richardson |
| 2011/0066405 A1 | 3/2011 | Chartrand et al. |
| 2011/0087350 A1 | 4/2011 | Fogel et al. |
| 2011/0228044 A1 | 9/2011 | Miyamoto et al. |
| 2011/0234497 A1 | 9/2011 | Zahnert et al. |
| 2011/0292997 A1 | 12/2011 | An et al. |
| 2011/0314049 A1 | 12/2011 | Poirier et al. |
| 2012/0105257 A1 | 5/2012 | Murillo et al. |
| 2012/0128340 A1 | 5/2012 | Lai |
| 2012/0133746 A1 | 5/2012 | Bigioi et al. |
| 2012/0154400 A1 | 6/2012 | Steen |
| 2012/0155846 A1 | 6/2012 | Gilbert-Schachter et al. |
| 2012/0194516 A1 | 8/2012 | Newcombe et al. |
| 2012/0249554 A1 | 10/2012 | Chen et al. |
| 2012/0270653 A1 | 10/2012 | Kareemi et al. |
| 2013/0027757 A1 | 1/2013 | Lee et al. |
| 2013/0093788 A1 | 4/2013 | Liu et al. |
| 2013/0120595 A1 | 5/2013 | Roach et al. |
| 2013/0129154 A1 | 5/2013 | Jin |
| 2013/0156297 A1* | 6/2013 | Shotton .................. G06F 18/28 |
| | | 382/159 |
| 2013/0193855 A1 | 8/2013 | Bauer |
| 2013/0215233 A1 | 8/2013 | Wang et al. |
| 2013/0300740 A1 | 11/2013 | Snyder et al. |
| 2013/0307848 A1 | 11/2013 | Tena et al. |
| 2013/0329020 A1 | 12/2013 | Kriveshko et al. |
| 2013/0335528 A1 | 12/2013 | Vishwanath et al. |
| 2013/0342564 A1 | 12/2013 | Kinnebrew et al. |
| 2014/0043436 A1 | 2/2014 | Bell et al. |
| 2014/0044343 A1 | 2/2014 | Bell et al. |
| 2014/0067106 A1 | 3/2014 | Makeig |
| 2014/0072201 A1 | 3/2014 | Tilt |
| 2014/0112573 A1 | 4/2014 | Francis, Jr. et al. |
| 2014/0118483 A1 | 5/2014 | Rapoport et al. |
| 2014/0118494 A1 | 5/2014 | Wu et al. |
| 2014/0210856 A1 | 7/2014 | Finn et al. |
| 2014/0321771 A1 | 10/2014 | Reinisch et al. |
| 2014/0340427 A1 | 11/2014 | Baker |
| 2014/0362256 A1 | 12/2014 | Schulze et al. |
| 2015/0015735 A1 | 1/2015 | Rav-Acha et al. |
| 2015/0024337 A1 | 1/2015 | Blassnig et al. |
| 2015/0062120 A1 | 3/2015 | Reisner-Kollmann et al. |
| 2015/0077768 A1 | 3/2015 | Edgar et al. |
| 2015/0103189 A1 | 4/2015 | Karpenko |
| 2015/0109415 A1 | 4/2015 | Son et al. |
| 2015/0145985 A1 | 5/2015 | Gourlay et al. |
| 2015/0199384 A1 | 7/2015 | Boncyk et al. |
| 2015/0229840 A1 | 8/2015 | Sawai et al. |
| 2015/0339530 A1 | 11/2015 | Neckels et al. |
| 2015/0379766 A1* | 12/2015 | Newman .............. H04N 13/296 |
| | | 356/5.01 |
| 2015/0381968 A1 | 12/2015 | Arora et al. |
| 2016/0026253 A1* | 1/2016 | Bradski ................ H04N 13/128 |
| | | 345/8 |
| 2016/0027215 A1 | 1/2016 | Burns et al. |
| 2016/0035082 A1 | 2/2016 | King et al. |
| 2016/0086336 A1 | 3/2016 | Lin et al. |
| 2016/0173716 A1 | 6/2016 | Zahnert et al. |
| 2016/0173749 A1 | 6/2016 | Dallas et al. |
| 2016/0227181 A1 | 8/2016 | Ilic et al. |
| 2016/0309085 A1 | 10/2016 | Ilic |
| 2016/0328827 A1 | 11/2016 | Ilic et al. |
| 2016/0330374 A1 | 11/2016 | Ilic et al. |
| 2016/0352979 A1 | 12/2016 | Ilic |
| 2016/0360119 A1 | 12/2016 | Ilic |
| 2017/0034429 A1 | 2/2017 | Huysegems et al. |
| 2017/0085733 A1 | 3/2017 | Ilic et al. |
| 2017/0118399 A1 | 4/2017 | Kim et al. |
| 2017/0118409 A1 | 4/2017 | Im et al. |
| 2018/0144535 A1 | 5/2018 | Ford et al. |
| 2019/0178654 A1* | 6/2019 | Hare ........................ G06T 7/70 |
| 2019/0197765 A1 | 6/2019 | Molyneaux et al. |
| 2019/0197774 A1 | 6/2019 | Molyneaux et al. |
| 2019/0197777 A1 | 6/2019 | Steinbrucker et al. |
| 2019/0342533 A1 | 11/2019 | Ilic et al. |
| 2019/0362469 A1 | 11/2019 | Ilic et al. |
| 2020/0007720 A1 | 1/2020 | Ilic |
| 2020/0025557 A1* | 1/2020 | Hoegele ............ G01B 11/2536 |
| 2020/0097071 A1* | 3/2020 | Johnston ............ G02B 27/0176 |
| 2020/0162629 A1 | 5/2020 | Ilic et al. |
| 2020/0184278 A1* | 6/2020 | Zadeh .................... G06N 3/044 |
| 2020/0202633 A1 | 6/2020 | Steinbrucker et al. |
| 2020/0374455 A1 | 11/2020 | Ilic et al. |
| 2021/0144353 A1 | 5/2021 | Ilic et al. |
| 2021/0209835 A1 | 7/2021 | Fonseka et al. |
| 2021/0248829 A1 | 8/2021 | Steinbrucker et al. |
| 2021/0392241 A1 | 12/2021 | Ilic |
| 2022/0103709 A1 | 3/2022 | Ilic et al. |

FOREIGN PATENT DOCUMENTS

| | | |
|---|---|---|
| DE | 19858935 A1 | 6/2000 |
| EP | 0277964 A1 | 8/1988 |
| EP | 1126404 A1 | 8/2001 |
| EP | 1164538 A2 | 12/2001 |
| EP | 1630721 A1 | 3/2006 |
| EP | 2189926 A1 | 5/2010 |
| EP | 2339534 A1 | 6/2011 |
| EP | 2851868 A1 | 3/2015 |
| GB | 2336195 A | 10/1999 |
| GB | 2489791 A | 10/2012 |
| JP | 2000-069352 A | 3/2000 |
| JP | 2000-175185 A | 6/2000 |
| JP | 2002-311471 A | 10/2002 |
| JP | 2004-077221 A | 3/2004 |
| JP | 2009-232275 A | 10/2009 |
| JP | 2011-086164 A | 4/2011 |
| JP | 2011-130282 A | 6/2011 |
| JP | 2012-078495 A | 4/2012 |
| JP | 2013-148824 A | 8/2013 |
| WO | WO 03/091868 A1 | 11/2003 |
| WO | WO 2006/085827 A1 | 8/2006 |
| WO | WO 2007/029903 A1 | 3/2007 |
| WO | WO 2007/084589 A2 | 7/2007 |
| WO | WO 2008/016474 A2 | 2/2008 |
| WO | WO 2013/054240 A1 | 4/2013 |
| WO | WO 2014/092740 A1 | 6/2014 |
| WO | WO 2014/191055 A1 | 12/2014 |
| WO | WO 2015/028587 A2 | 3/2015 |
| WO | WO 2015/082572 A2 | 6/2015 |
| WO | WO 2015/104236 A1 | 7/2015 |
| WO | WO 2015/173173 A1 | 7/2015 |
| WO | WO 2017/105864 A1 | 6/2017 |

OTHER PUBLICATIONS

Hatem Alismail, Direct Pose Estimation and Refinement, Aug. 2016. (Year: 2016).*
Chinese Office Action dated Apr. 6, 2021 in connection with Chinese Application No. 201680082863.5.
European communication dated Jan. 11, 2021 in connection with European Application No. 16847598.6.

(56) References Cited

OTHER PUBLICATIONS

European Communication for European Application No. 15700021.7 dated Sep. 18, 2019.
European Communication for European Application No. 16172980.1 dated Jan. 8, 2018.
European Communication for European Application No. 19173155.3 dated Jan. 19, 2021.
European Search Report dated Nov. 29, 2010 from corresponding European Application No. 10163475.6.
Extended European Search Report and Written Opinion dated Aug. 31, 2010 from corresponding European Application No. 10163475.6.
Extended European Search Report dated Jul. 3, 2019 for European Application No. 19173155.3.
Extended European Search Report dated Oct. 15, 2020 in connection with European Application No. 20188140.6.
Extended European Search Report dated Sep. 7, 2016 from corresponding European Application No. 16172971.0.
Extended European Search Report for European Application No. 20168065.9, dated Jun. 15, 2020.
Extended European Search Report for European Application No. 20169941.0, dated Jun. 17, 2020.
International Preliminary Report on Patentability dated Apr. 19, 2012, from International Application No. PCT/EP2011/053775.
International Preliminary Report on Patentability for International Application No. PCT/EP2015/060320 dated Nov. 24, 2016.
International Preliminary Report on Patentability for International Application No. PCT/IB2016/001985 dated Jul. 12, 2018.
International Search Report and Written Opinion for Application No. PCT/EP2014/068337 mailed Mar. 17, 2015.
International Search Report and Written Opinion for Application No. PCT/EP2014/076469 mailed Jun. 30, 2015.
International Search Report and Written Opinion for Application No. PCT/EP2015/050038 mailed Mar. 19, 2015.
International Search Report and Written Opinion for Application No. PCT./EP2015/050036 mailed Apr. 7, 2015.
International Search Report and Written Opinion for International Application No. PCT/EP2015/060320 dated Aug. 4, 2015.
International Search Report and Written Opinion for International Application No. PCT/US2018/067146 mailed Apr. 30, 2019.
International Search Report and Written Opinion for International Application No. PCT/US2018/067134 mailed Apr. 24, 2019.
International Search Report and Written Opinion for International Application No. PCT/US2018/067156 mailed Mar. 8, 2019.
International Search Report and Written Opinion for International Application No. PCT/US2018/067105 mailed Mar. 7, 2019.
International Search Report and Written Opinion for International Application No. PCT/IB2016/001985 dated May 22, 2017.
International Search Report and Written Opinion for International Application No. PCT/US2021/031514 mailed Aug. 13, 2021.
International Search Report and Written Opinion mailed Jun. 1, 2011, from International Application No. PCT/EP2011/053775.
Invitation to Pay Additional Fees for International Application No. PCT/US2018/067146 mailed Feb. 14, 2019.
Invitation to Pay Additional Fees for International Application No. PCT/US2018/067134 mailed Feb. 7, 2019.
Japanese Office Action dated Nov. 24, 2020 in connection with Japanese Application No. 2018-553329.
[No Author Listed], 3D projection—Wikipedia. Oct. 13, 203. 5 pages. URL:https://en.wikipedia.org/w/index.php?title=3D_projection&oldid=576958692 [last accessed on Nov. 10, 2020].
[No Author Listed], 3D Reconstruction with Depth from Stereo—Qualcomm. Jun. 23, 2015. 2 pages. URL:https://www.qualcomm.com/videos/3d-reconstruction-depth-stereo [last accessed on Mar. 17, 2022].
[No Author Listed], Canon digital IXUS 65 Advanced Camera User Guide. 2006. 70 pages. https://www.canon.co.uk/support/consumer_products/products/cameras/digital_compact/digital_ixus_series/digital_ixus_65.aspx?type=drivers&language=&os=windows 7 (64-bit) [last accessed on Feb. 11, 2019].
[No Author Listed], capturing text for OCR in lowlight—ideal minimum MP + >?s. Cameras Forum—CNET. Jul. 15, 2004. 5 pages. URL:https://www.cnet.com/forums/discussions/capturing-text-for-ocr-in-lowlight-ideal-minimum-mp-s-29389 [last accessed on Jan. 30, 2018].
[No Author Listed], Diy Mouse Scanner. 2007. 1 page. URL:http://www.diylive.net/index.php/2007/07/20/diy-mouse-scanner/> [last accessed on Feb. 8, 2010].
[No Author Listed], Fyusion—Beautiful 3D images with AI understanding. Fyusion, Inc. 2022. 6 pages. URL:http://fyusion.com [last accessed on Mar. 17, 2022].
[No Author Listed], Intel RealSense Technology. Intel Corporation. 2022. 6 pages. URL:https://www.intel.com/content/www/us/en/architecture-and-technology/realsense-overview.html [last accessed on Mar. 17, 2022].
[No Author Listed], Learn how to use 123d Catch. 123d Catch. May 2, 2014. 16 pages. URL:http://web.archive.org/web/20140502092851/http://www.123dapp.com/howto/catch [last accessed on Sep. 7, 2015].
[No Author Listed], Snapchat—The fastest way to share a moment. 2022. 1 page. URL:http://www.seene.co [last accessed on Mar. 17, 2022].
[No Author Listed], Structure—The world's leading healthcare 3D scanning platform. Occipital, Inc. 2022. 7 pages. URL:http://www.structure.io [last accessed on Mar. 17, 2022].
[No Author Listed], The basic rules for STL files. SDPRINTUK. May 3, 2014. 1 page. URL:http://web.archive.org/web/20140503142737/http://www.3dprint-uk.co.uk/the-basic-rules-for-stl-files [last accessed on Sep. 7, 2015].
[No Author Listed], Trnio 3D Scanner. 2022. 5 pages. URL:http://www.trnio.com [last accessed on Mar. 17, 2022].
[No Author Listed], Turn ordinary photos into extraordinary 3D models with 123D catch. 123Catch. May 11, 2014. 6 pages. URL:http://web.archive.org/web/20140511055906/http://www.123dapp.com/catch [last accessed on Sep. 7, 2015].
Agarwal et al., Building rome in a day. Communications of the ACM. Oct. 2011;54(10):105-12. DOI: 10.1145/2001269.2001293.
Agarwal et al., Bundle adjustment in the large. European conference on computer vision (ECCV). 2010;29-42.
Alismail, Direct pose estimation and refinement. Doctoral dissertation, The Robotics Institute Carnegie Mellon University Pittsburgh. Aug. 2016. 33 pages.
Baran et al., Automatic rigging and animation of 3d characters. ACM Transactions on Graphics (TOG). 2007. 8 pages.
Blanz et al., A morphable model for the synthesis of 3D faces. Proceedings of the 26th annual conference on Computer graphics and interactive techniques. Jul. 1999, pp. 187-194.
Bordallo, Panorama Imaging for Mobile Phones. Master's Thesis. May 2010. 59 pages. URL:https://www.researchgate.net/profile/Miguel_Bordallo_Lopez/publication/260789117_panorama_imaging_for_mobile_phones/links/0c96053235d78b8f51000000/panorama-imaging-for-mobile-phones.pdf [last accessed on Dec. 21, 2020].
Brown, A Survey of Image Registration Techniques. ACM Computing Surveys. Dec. 1992;24(4): 325-76.
Coorg, Pose imagery and automated three-dimensional modeling of urban environments. Doctoral dissertation, Massachusetts Institute of Technology. Sep. 1998. 47 pages.
Curless, From range scans to 3D models. ACM SIGGRAPH Computer Graphics. Nov. 1999;33(4):38-41.
Davison, Real-Time Simultaneous Localisation and Mapping with a Single Camera. Proceeding Ninth IEEE International Conference on Computer Vision (ICCV). 2003. 8 pages. doi:10.1109/iccv.2003.1238654.
Elghazi, Building Skins in the Age of Information Technology. Thesis Submitted to Faculty of Engineering at Cairo University in Partial Fulfillment of the Requirements for the Degree of Master of Science in Architectural Engineering Faculty of Engineering. May 2009. 99 pages. https://www.academia.edu/10664577/Building_Skins_in_the_Age_of_Information_Technology [last retrieved on Apr. 7, 2019].
Faessler et al., Autonomous, vision-based flight and live dense 3D mapping with a quadrotor micro aerial vehicle. Journal of Field Robotics. Jun. 2016;33(4):431-50.

(56) References Cited

OTHER PUBLICATIONS

Forster et al., Collaborative monocular slam with multiple micro aerial vehicles. 2013 IEEE/RSJ International Conference on Intelligent Robots and Systems. Nov. 2013, pp. 3963-3970.
Forster et al., Continuous on-board monocular-vision-based elevation mapping applied to autonomous landing of micro aerial vehicles. 2015 IEEE International Conference on Robotics and Automation (ICRA). May 2015, pp. 111-118.
Forster et al., IMU preintegration on manifold for efficient visual-inertial maximum-a-posteriori estimation. Robotics: Science and Systems. Jul. 2015. 10 pages.
Forster et al., SVO: Fast semi-direct monocular visual odometry. 2014 IEEE international conference on robotics and automation (ICRA). May 31-Jun. 7, 2014, pp. 15-22.
Grant et al., Efficient Velodyne SLAM with point and plane features. Autonomous Robots. 2018. 18 pages. DOI:10.1007/s10514-018-9794-6.
Grisetti et al., A tutorial on graph-based SLAM. IEEE Intelligent Transportation Systems Magazine. Dec. 2010. 12 pages.
Hirshberg et al., Coregistration: Simultaneous alignment and modeling of articulated 3D shape. Proceedings of the 12th European conference on Computer Vision—vol. Part VI. 2012, pp. 242-255.
Hoiem et al., Representations and Techniques for 3D Object Recognition and Scene Interpretation. Synthesis Lectures on Artificial Intelligence and Machine Learning. Morgan and Claypool Publishers. Aug. 2011. 31 pages. http://dhoiem.cs.illinois.edu/publications/HoiemSavareseFinal.pdf [last accessed on Apr. 13, 2019].
Hosseinzadeh et al., Structure aware SLAM using quadrics and planes. arXiv:1804.09111v3. Nov. 2, 2018. 22 pages.
Hsiao et al., Dense planar-inertial SLAM with structural constraints. 2018. 8 pages. DOI:10.1109/ICRA.2018.8461094.
Hsiao et al., Keyframe-based dense planar SLAM. 2017 IEEE International Conference on Robotics and Automation (ICRA). 2017. 8 pages. DOI: 10.1109/ICRA.2017.7989597.
Huang et al., Animated panorama from a panning video sequence. Image and Vision Computing New Zealand (IVCNZ), 2010 25th International Conference of, IEEE. Nov. 2010, pp. 1-8.
Huang et al., Optimization for rgb-d SLAM based on plane geometrical constraint. 2019 IEEE International Symposium on Mixed and Augmented Reality Adjunct (ISMAR-Adjunct). 2019;326-331.
Kaess et al., iSAM2: Incremental smoothing and mapping using the Bayes tree. The International Journal of Robotics Research. May 2012. 20 pages. DOI: 10.1177/0278364911430419.
Kaess. Simultaneous localization and mapping with infinite planes. 2015. 7 pages. DOI:10.1109/ICRA.2015.7139837.
Keller et al., Real-time 3D Reconstruction in Dynamic Scenes using Point-based Fusion. 2013. 8 pages. URL:http://reality.cs.ucl.ac.uk/projects/kinect/keller13realtime.pdf [last accessed on Jun. 17, 2020].
Kim et al., Linear RGB-D SLAM for planar environments. Proceedings of the European Conference on Computer Vision (ECCV). 2018. 16 pages.
Klein et al., Parallel tracking and mapping on a camera phone. 2009 8th IEEE International Symposium on Mixed and Augmented Reality. Oct. 2009, pp. 83-86.
Kolev et al., Turning Mobile Phones into 3D Scanners. 2014 IEEE Conference on Computer Vision and Pattern Recognition. Jun. 2014, pp. 3946-3953.
Lanman et al., Build your own 3D scanner: 3D photography for beginners. ACM SIGGRAPH 2009 Course Notes. Aug. 5, 2009. 94 pages.
Lee et al., Indoor mapping using planes extracted from noisy RGB-D sensors. 2012 IEEE/RSJ International Conference on Intelligent Robots and Systems. Oct. 2012, pp. 1727-1733.
Lee et al., MAV visual SLAM with plane constraint. 2011 IEEE International Conference on Robotics and Automation. 2011. 6 pages. DOI: 10.1109/ICRA.2011.5980365.
Levenberg, A method for the solution of certain non-linear problems in least squares. Quarterly of applied mathematics. 1944;2(2):164-8.
Li et al., 3D self-portraits. ACM Transactions on Graphics (TOG). Nov. 2013;32(6):1-9.

Lin et al., Diffuse-Specular Separation and Depth Recovery from Image Sequences. Correct System Design. 2002;2352:16 pages.
Liu et al., Robust keyframe-based monocular SLAM for augmented reality. 2016 IEEE International Symposium on Mixed and Augmented Reality (ISMAR). Sep. 2016, pp. 1-10. DOI 10.1109/ISMAR.2016.24.
Lopez et al., Graphics hardware accelerated panorama builder for mobile phones. Proc. of SPIE-IS&T Electronic Imaging. Jan. 2009; 7256:72560D1-D9.
Lourakis et al., Detecting Planes in an Uncalibrated Image Pair. BMVC. 2002, pp. 587-596. DOI:10.5244/C.16.5.
Lourakis et al., SBA: A software package for generic sparse bundle adjustment. ACM Transactions on Mathematical Software (TOMS). Mar. 2009;36(1):1-30. DOI: 10.1145/1486525.1486527.
Lucas et al., An Iterative Image Registration Technique with an Application to Stereo Vision. Proceedings of Imaging Understanding Workshop. 1981;121-9.
Majdik et al., Micro air vehicle localization and position tracking from textured 3d cadastral models. 2014 IEEE International Conference on Robotics and Automation (ICRA). May 31-Jun. 7, 2014, pp. 920-927.
Melantoni, 123D Design desktop 1.4: 3D file import and 3D printing enhancements. May 8, 2014. 3 pages. URL:http://blog123dapp.com/2014/05/123d-design-desktop-1-4-3d-file-import-and-3d-printing-enhancements [last accessed on Aug. 7, 2015].
Merrell et al., Real-Time Visibility-Based Fusion of Depth Maps. IEEE 11th International Conference on Computer Vision. 2007. 8 pages.
Moré, The Levenberg-Marquardt algorithm: implementation and theory. Conference on Numerical Analysis. Jun. 28-Jul. 1, 1977. 16 pages.
Mur-Artal et al., Orb-slam2: An open-source slam system for monocular, stereo, and rgb-d cameras. arXiv:1610.06475v2. Jun. 19, 2017. 9 pages.
Nakajima et al., Video Mosaicing for Document Imaging. Proc CBDAR. Demo Session. Jan. 1, 2007. 8 pages.
Nakao et al., An Image Input Unit Using Digital Mosaic Processing. NEC Research and Development. Apr. 1999;40(2):259-66.
Newcombe et al., Kinectfusion: Real-time dense surface mapping and tracking. 2011. 10 pages. DOI: 10.1109/ISMAR.2011.6092378.
Newcombe et al., Live Dense Reconstruction with a Single Moving Camera. IEEE Conference on Computer Vision and Pattern Recognition (CVPR). 2010, pp. 1498-1505.
Pathak et al., Fast registration based on noisy planes with unknown correspondences for 3-D mapping. IEEE Transactions on Robotics. Jul. 2010. 31 pages. DOI: 10.1109/TRO.2010.2042989.
Pizzoli et al., REMODE: Probabilistic, monocular dense reconstruction in real time. 2014 IEEE International Conference on Robotics and Automation (ICRA). May 31-Jun. 7, 2014, pp. 2609-2616.
Pollefeys et al., Detailed Real-Time Urban 3D Reconstruction from Video. International Journal of Computer Vision. 2008;78:143-167. doi:10.1007/s11263-007-0086-4.
Poranne, Topics in Shape Optimization and Exploration. Research Thesis. Jul. 2013. Submitted to the Senate of the Technion—Israel Institute of Technology. 50 pages.
Pradeep et al., MonoFusion: Real-time 3D reconstruction of small scenes with a single web camera. IEEE International Symposium on Mixed and Augmented Reality (ISMAR). 2013, pp. 83-88. doi: 10.1109/ismar.2013.6671767.
Qi et al., Pointnet: Deep learning on point sets for 3d classification and segmentation. Proceedings of the IEEE conference on computer vision and pattern recognition (CVPR). 2017;652-660.
Salas-Moreno et al., Dense planar SLAM. 2014 IEEE international symposium on mixed and augmented reality (ISMAR) 2014. 8 pages. DOI: 10.1109/ISMAR.2014.6948422.
Sammarco, 123D Catch—Tutorial. Digital Culture. Jan. 17, 2012. 16 pages.
Saurer et al., A minimal solution to the rolling shutter pose estimation problem. 2015 IEEE/RSJ International Conference on Intelligent Robots and Systems (IROS). 2015. 7 pages.
Schonberger et al., Structure-from-motion revisited. Proceedings of the IEEE conference on computer vision and pattern recognition. 2016;4104-4113.

(56) References Cited

OTHER PUBLICATIONS

Taguchi et al., Point-plane SLAM for hand-held 3D sensors. 2013 IEEE international conference on robotics and automation (ICRA). May 14, 2013. 10 pages.
Tanskanen et al., Live metric 3D reconstruction on mobile phones. Proceedings of the IEEE International Conference on Computer Vision. 2013, pp. 65-72.
Tanskanen et al., Semi-direct EKF-based monocular visual-inertial odometry. 2015 IEEE/RSJ International Conference on Intelligent Robots and Systems (IROS). Sep. 28-Oct. 2, 2015, pp. 6073-6078.
Thrun et al., The GraphSLAM algorithm with applications to large-scale mapping of urban structures. The International Journal of Robotics Research. May 2006;25(5-6):403-29.
Trevor et al., Planar surface SLAM with 3D and 2D sensors. 2012 IEEE International Conference on Robotics and Automation. May 2012, pp. 3041-3048. DOI:10.1109/ICRA.2012.6225287.
Triggs et al., Bundle adjustment—a modern synthesis. Lecture Notes in Computer Science. 2000. 72 pages.
Vlasic et al., Dynamic shape capture using multi-view photometric stereo. ACM Transaction on Graphics. Dec. 2009;28(5):1-11.
Wang et al., A submap joining algorithm for 3d reconstruction using an rgb-d camera based on point and plane features. Robotics and Autonomous Systems. Preprint. Mar. 9, 2018. 20 pages. DOI: 10.1016/J.ROBOT.2019.05.002.
Weise et al., Face/off: Live facial puppetry. Eurographics/ ACM SIGGRAPH Symposium on Computer Animation. 2009. 10 pages.
Weise et al., In-hand scanning with online loop closure. 2009 IEEE 12th International Conference on Computer Vision Workshops, ICCV Workshops. Sep. 2009, pp. 1630-1637.
Weise et al., Online loop closure for real-time interactive 3D scanning. Computer Vision and Image Understanding. 2011;115:635-648.
Wu et al., Multicore bundle adjustment. CVPR. 2001;3057-3064.
Yang et al., Inertial sensors image alignment and stitching for panorama on mobile phones. Proceedings of the 1st International Workshop on Mobile Location-Based Service, MLBS '11. New York, New York. Sep. 2011, p. 21.
Yang et al., Monocular object and plane slam in structured environments. IEEE Robotics and Automation Letters. Preprint version. arXiv:1809.034152v2. Jun. 28, 2019. 8 pages.
Yang et al., Pop-up slam: Semantic monocular plane slam for low-texture environments. 2016 IEEE/RSJ International Conference on Intelligent Robots and Systems (IROS). Oct. 2016. 9 pages. DOI: 10.1109/IROS.2016.7759204.
Yang et al., Tightly-coupled aided inertial navigation with point and plane features. 2019 International Conference on Robotics and Automation (ICRA). May 2019. 8 pages. DOI: 10.1109/ICRA.2019.8794078.
Zach, Robust bundle adjustment revisited. European Conference on Computer Vision. 2014;772-787.
Zhang et al., Distributed very large scale bundle adjustment by global camera consensus. Proceedings of the IEEE International Conference on Computer Vision. 2017, pp. 29-38.
Zhang et al., Low-drift and real-time lidar odometry and mapping. Autonomous Robots. Feb. 2017. 17 pages. DOI: 10.1007/s10514-016-9548-2.
Zhang et al., Point cloud registration with 2D and 3D fusion information on mobile robot integrated vision system. 2013 IEEE International Conference on Robotics and Biomimetics (ROBIO). Dec. 12, 2013, pp. 1187-1192.
Zhao et al., Alignment of continuous video onto 3D point clouds. Proceedings of the 2004 IEEE Computer Society Conference on Computer Vision and Pattern Recognition. CVPR 2004. Jun. 27, 2004. 8 pages.

U.S. Appl. No. 16/067,210, filed Jun. 29, 2018, Fonseka et al.
U.S. Appl. No. 16/899,487, filed Jun. 11, 2020, Ilic et al.
U.S. Appl. No. 16/950,752, filed Nov. 17, 2020, Ilic et al.
U.S. Appl. No. 17/461,778, filed Aug. 30, 2021, Ilic.
U.S. Appl. No. 17/547,751, filed Dec. 10, 2021, Ilic et al.
CN 201680082863.5, Apr. 6, 2021, Chinese Office Action.
EP 10163475.6, Aug. 31, 2010, Extended European Search Report and Written Opinion.
EP 10163475.6, Nov. 29, 2010, European Search Report.
EP 15700021.7, Sep. 18, 2019, European Communication.
EP 16172971.0, Sep. 7, 2016, Extended European Search Report.
EP 16172980.1, Jan. 8, 2018, European Communication.
EP 16847598.6, Jan. 11, 2021, European Communication.
EP 19173155.3, Jul. 3, 2019, Extended European Search Report.
EP 19173155.3, Jan. 19, 2021, European Communication.
EP 20168065.9, Jun. 15, 2020, Extended European Search Report.
EP 20169941.0, Jun. 17, 2010, Extended European Search Report.
EP 20188140.6, Oct. 15, 2020, Extended European Search Report.
JP 2018-553329, Nov. 24, 2020, Japanese Office Action.
PCT/EP2011/053775, Jun. 1, 2011, International Search Report and Written Opinion.
PCT/EP2011/053775, Apr. 19, 2012, International Preliminary Report on Patentability.
PCT/EP2014/068337, Mar. 17, 2015, International Search Report and Written Opinion.
PCT/EP2014/076469, Jun. 30, 2015, International Searnh Report and Written Opinion.
PCT/EP2015/050036, Apr. 7, 2015, International Search Report and Written Opinion.
PCT/EP2015/050038, Mar. 19, 2015, International Searlch Report and Written Opinion.
PCT/EP2015/060320, Aug. 4, 2015, International Search Report and Written Opinion.
PCT/EP2015/060320, Nov. 24, 2016, International Prelinlinary Report on Patentability.
PCT/IB2016/001985, May 22, 2017, International Search Report and Written Opinion.
PCT/IB2016/001985, Jul. 12, 2018, International Preliminary Report on Patentability.
PCT/US2018/067105, Feb. 7, 2019, International Search Report and Written Opinion.
PCT/US2018/067134, Feb. 7, 2019, Invitation to Pay Additional Fees.
PCT/US2018/067134, Apr. 24, 2019, International Search Report and Written Opinion.
PCT/US2018/067146, Feb. 14, 2019, Invitation to Pay Additional Fees.
PCT/US2018/067146, Apr. 30, 2019, International Search Report and Written Opinion.
PCT/US2018/067156, Mar. 8, 2019, International Search Report and Written Opinion.
PCT/US2021/031514, Aug. 13, 2021, International Search Report and Written Opinion.
Extended European Search Report dated May 24, 2024 in connection with European Application No. 21804563.1.
Hartley et al., A6.6 Application of sparse LM to multiple image bundle adjustment. Multiple View Geometry in Computer Vision. Second Edition. Cambridge University Press. 2004. pp. 611-613.
Klein et al., Parallel Tracking and Mapping for Small AR Workspaces. 2007 6th IEEE and ACM International Symposium on Mixed and Augmented Reality. Nov. 2007, pp. 225-234.
Konolige et al., FrameSLAM: From bundle adjustment to real-time visual mapping. IEEE Transactions on Robotics. Oct. 2008;24(5):1066-77.

* cited by examiner

COMPUTATIONALLY EFFICIENT METHOD FOR COMPUTING A COMPOSITE REPRESENTATION OF A 3D ENVIRONMENT

RELATED APPLICATIONS

This application claims priority to and the benefit of U.S. Provisional Patent Application Ser. No. 63/023,089, filed May 11, 2020 and entitled "COMPUTATIONALLY EFFICIENT METHOD FOR COMPUTING A COMPOSITE REPRESENTATION OF A 3D ENVIRONMENT," which is hereby incorporated herein by reference in its entirety.

TECHNICAL FIELD

This application relates generally to providing representations of environments, for example, in cross reality (XR) systems, autonomous vehicles, or other computer vision systems that include movable sensors.

BACKGROUND

Systems that use sensors to acquire information about a 3D environment are used in multiple contexts, such as cross reality (XR) systems or autonomous vehicles. These systems may employ sensors, such as cameras, to acquire information about the 3D environment. The sensors may provide many observations of the environment that may be integrated into a representation of the environment. For example, as an autonomous vehicle moves, its sensors may acquire images of the 3D environment from different poses. Each image may provide another observation of the environment, providing more information about a portion of the environment previously image or information about a new portion of the environment.

Such a system may assemble the information acquired over multiple observations into a composite representation of the 3D environment. New images may be added to the composite representation of the environment, filling in information based on the pose from which that image was acquired. Initially, the pose of an image may be estimated, such as based on outputs of internal sensors that indicate motion of the sensors acquiring the images or correlation of features relative to features in prior images that have already been incorporated into the composite representation of the environment. Over time, however, errors in these estimation techniques may accumulate.

To compensate for accumulated errors, an adjustment of the composite representation may be performed from time to time. Such an adjustment may entail adjusting the poses of the images that have been combined into the composite representation such that features in different images representing the same objects in the 3D environment better align. In some scenarios, the features that are aligned may be feature points. In other scenarios, the features may be planes that are identified based on the contents of the images. In such a scenario, the adjustment may entail adjusting both the relative pose of each image and the relative position of planes detected based on the composite representation.

Such an adjustment may provide an accurate representation of the 3D environment that may be used in any of multiple ways. In an XR system, for example, computers may control human user interfaces to create a cross reality (XR) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users sense or perceive as a part of a physical world such that users can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

To realistically render virtual content, an XR system may build a representation of the physical world around a user of the system. This representation, for example, may be constructed by processing images acquired with sensors on a wearable device that forms a part of the XR system. In such a system, a user might perform an initialization routine by looking around a room or other physical environment in which the user intends to use the XR system until the system acquires sufficient information to construct a representation of that environment. As the system operates and the user moves around the environment or to other environments, the sensors on the wearable devices might acquire additional information to expand or update the representation of the physical world.

BRIEF SUMMARY

Aspects of the present application relate to methods and apparatus for providing representations of environments, for example, in cross reality (XR) systems, autonomous vehicles, or other computer vision systems that include movable sensors. Techniques as described herein may be used together, separately, or in any suitable combination.

Some embodiments relate to a method of operating a computing system to generate a representation of an environment. The method comprises obtaining sensor captured information, the sensor captured information comprising a first number of images; providing an initial representation of the environment, the initial representation comprising the first number of initial poses and initial parameters of a second number of planar features based at least in part on the first number of images; for each of the second number of planar features at each pose corresponding to an image comprising one or more observations of the planar feature, computing a matrix indicating the one or more observations of the planar feature, and factorizing the matrix into two or more matrices, the two or more matrices comprising one matrix having reduced rows compared with the matrix; and computing the first number of refined poses and refined parameters of the second number of planar features based at least in part on the matrices having reduced rows. The representation of the environment comprises the first number of refined poses and the refined parameters of the second number of planar features.

Some embodiments relate to a method of operating a computing system to generate a representation of an environment. The method comprises obtaining sensor captured information, the sensor captured information comprising a first number of images; providing an initial representation of the environment, the initial representation comprising the first number of initial poses and initial parameters of a second number of planar features based at least in part on the first number of images; for each of the second number of planar features at each pose corresponding to an image comprising one or more observations of the planar feature, computing a matrix having a third number of rows, the third number being smaller than the number of the one or more observations of the planar feature; and computing the first number of refined poses and refined parameters of the second number of planar features based at least in part on the matrices having the third number of rows. The representation of the environment comprises the first number of refined poses and the refined parameters of the second number of planar features.

The foregoing summary is provided by way of illustration and is not intended to be limiting.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
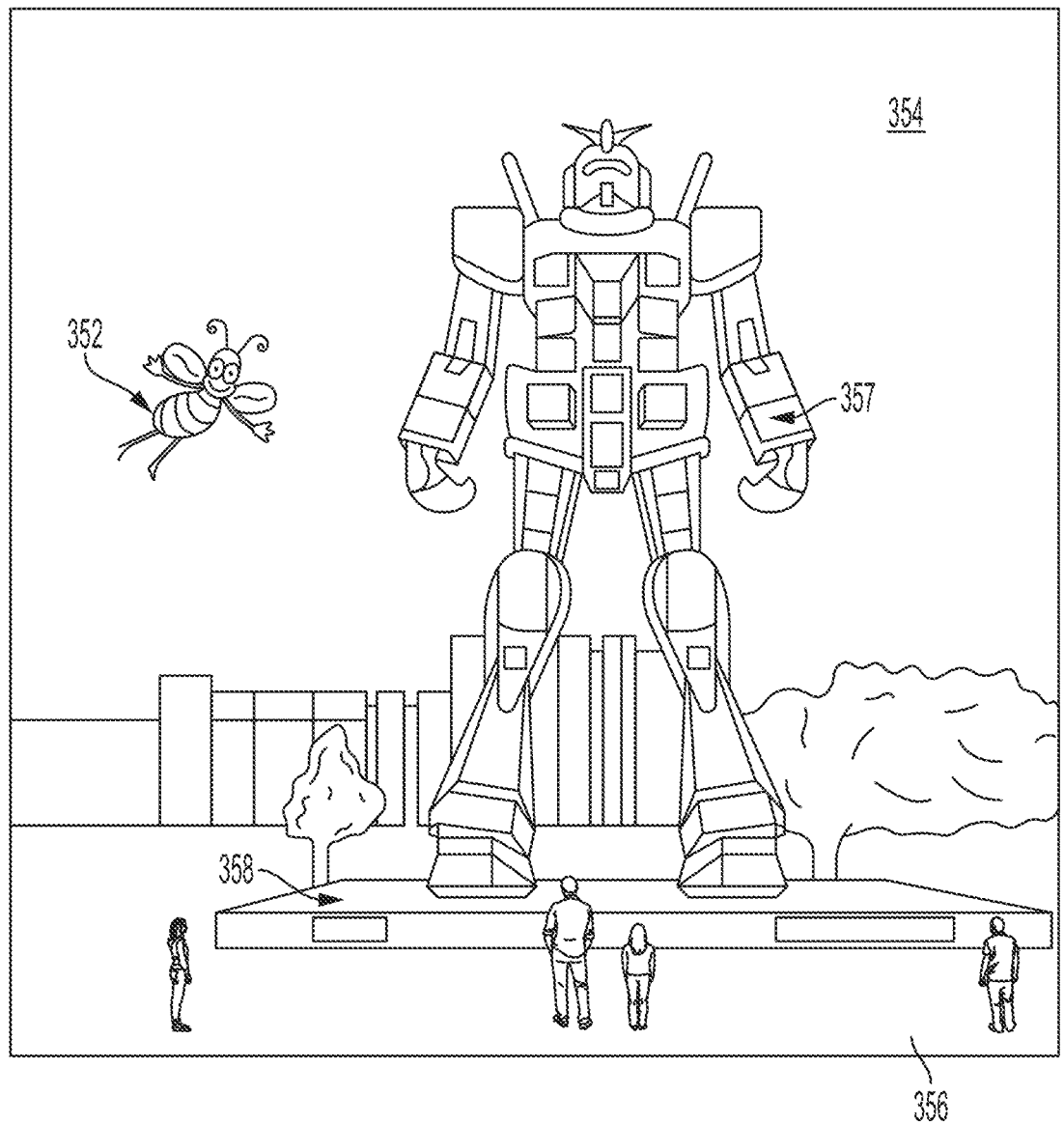
FIG. 1 is a sketch illustrating an example of a simplified augmented reality (AR) scene, according to some embodiments.

Described herein are methods and apparatus for providing a representation of an environment, for example, in an XR system, and any suitable computer vision and robotics applications. The inventors have recognized and appreciated methods and apparatus that provide representations of potentially complex environments, such as rooms with many objects in them, with reduced time and reduced computational cost and memory usage. In some embodiments, an accurate representation of an environment may be provided by computational techniques that reduce the amount of information processed in adjusting a composite representation of a 3D environment to reduce errors accumulated in building the composite representation from multiple observations over time. These techniques may be applied in systems that represent the environment by planes, detected in a representation of the environment constructed by combining images of the environment acquired at multiple poses. Such techniques may be based on a reduced matrix and a reduced residual vector in lieu of a Jacobian matrix and an original residual vector.

Computationally less burdensome processing and or lower memory usage may be used in a system to provide for an accurate representation of the 3D environment with lower latency, lower power consumption, less heat generation, lower weight, or other advantages. An XR system is an example of a system that may be improved with such a technique. With low computations complexity, for example, a user device for the XR system may be formed by programming on a smartphone.

In some embodiments, to provide realistic XR experiences to multiple users, an XR system must know the users' physical surroundings in order to correctly correlate locations of virtual objects in relation to real objects. An XR system may build a representation of an environment, in which virtual objects may be displayed. The representation of the environment may be created from information collected with sensors that are part of XR devices of the XR system. An XR device may be a head mounted device with integrated displays and sensors, a handheld mobile device (e.g., smartphone, smartwatch, tablet computing device, etc.), or other device having sensors. However, techniques as described herein may be used on other types of devices having sensors, such as autonomous machines with sensors. Such devices may include one or more types of sensors including, for example, image sensors, LiDAR cameras, RGBD cameras, infrared cameras, structured light sensors, ultrasound sensors, or coherent light sensors. These devices may include one or more components that aid in collecting sensor information, such as infrared emitters, ultrasound emitters, or structured light emitters. Alternatively or additionally, such devices may include sensors that aid in determining pose, such as gyroscopic sensors, accelerometers, magnetometers, altimeters, proximity sensors, and GPS sensors.

The representation of the environment, in some embodiments, may be a local map of the environment surrounding an XR device, and created by the XR device by integrating information from one or more images collected as the device operates. In some embodiments, the coordinate system of a local map may be tied to the position and/or orientation of the device when the device first initiates scanning the environment (e.g. starts a new session). That position and/or orientation of the device may change from session to session.

A local map may include sparse information, representing the environment based on a subset of features detected in sensor captured information used in forming the map. Additionally or alternatively, a local map may include dense information, representing the environment with information of surfaces in the environment such as meshes.

The subset of features in a map may include one or more types of features. In some embodiments, the subset of features may include point features such as table corners, which may be detected based on visual information. In some embodiments, the system may alternatively or additionally form a representation of a 3D environment based on higher level features, such as planar features such as planes. Planes, for example, may be detected by processing depth information. A device may store planar features instead of or in addition to feature points, but in some embodiments, storing planar features in lieu of corresponding point features may reduce the size of the map. For example, a plane may be stored in a map represented with a plane normal and a signed distance to the origin of the coordinate system of the map. In contrast, the same structure might be stored as multiple feature points.

In addition to potentially supplying input to create maps, sensor captured information may be used to track devices' motions in an environment. The tracking may enable an XR system to localize XR devices by estimating respective devices' poses relative to the frame of reference established by a map. Localizing an XR device may require making comparisons to find a match between a set of measurements extracted from images captured by the XR device and a set of features stored in an existing map.

This co-dependence between the creation of a map and the localization of a device constitutes significant challenges. Even with the simplification of using planes to represent surfaces in the 3D environment, substantial processing may be required to accurately create the map and localize the device simultaneously. The processing must be accomplished quickly as devices move in the environment. On the other hand, an XR device might have limited computational resources so that the device can move with reasonable flexibility at a reasonable speed in the environment.

That processing may include jointly optimizing planar feature parameters and sensor poses used in forming the map of the 3D environment in which planes are detected. Conventional techniques for jointly optimizing planar feature parameters and poses may incur high computational cost and memory consumption. Because a sensor can record different observations of a planar feature at different poses, joint optimization according to a conventional approach may require solution of a very large nonlinear least-squares problem for even for a small-scale workspace.

As used herein, "optimizing" (and similar terms) need not result in a perfect or theoretically best solution. Rather, optimization may result from processing that reduces a measure of error in a solution. Processing to reduce error may be performed until a solution with sufficiently low error is reached. Such processing may be performed iteratively, and iterations may be performed until an exit criteria, indicative a sufficiently low error, is detected. The exit criteria may be an indication that processing has converged to a solution which might be detected by a percentage reduction in error from iteration to iteration that is below a threshold and/or may be a predetermined number of iterations and/or other criteria that indicate a solution with low error has been identified.

Techniques for efficient map optimization are described herein, with an XR system being used as an example of a system that may optimize a map with these techniques. In some embodiments, information about each plane in a map is collected in each of multiple images acquired from a respective pose. An observation of each plane may be made at each pose at which an image used in creating the 3D representation was captured. This information that indicates the one or more observations of the planes may be formatted as a matrix. In a conventional approach to optimizing the map, this matrix may be a Jacobean and optimization may be based on computations performed using this Jacobean matrix.

In accordance with some embodiments, optimization may be performed based on factorized matrices, which may be mathematically related to a matrix as used in the conventional approach, but which may have reduced rows compared with the matrix. The XR system may compute refined parameters of the planar features and refined poses based on one of the factorized matrices having reduced rows, which reduces computational cost and memory storage. The refined parameters of the planar features and refined poses may be computed such that projection errors of the observations of the planar features to respective planar features from respective refined poses are minimum.

Techniques as described herein may be used together or separately with many types of devices and for many types of environments, including wearable or portable or autonomous devices with limited computational resources. In some embodiments, the techniques may be implemented by one or more services that form a portion of an XR system.

Exemplary System

Figure 2:
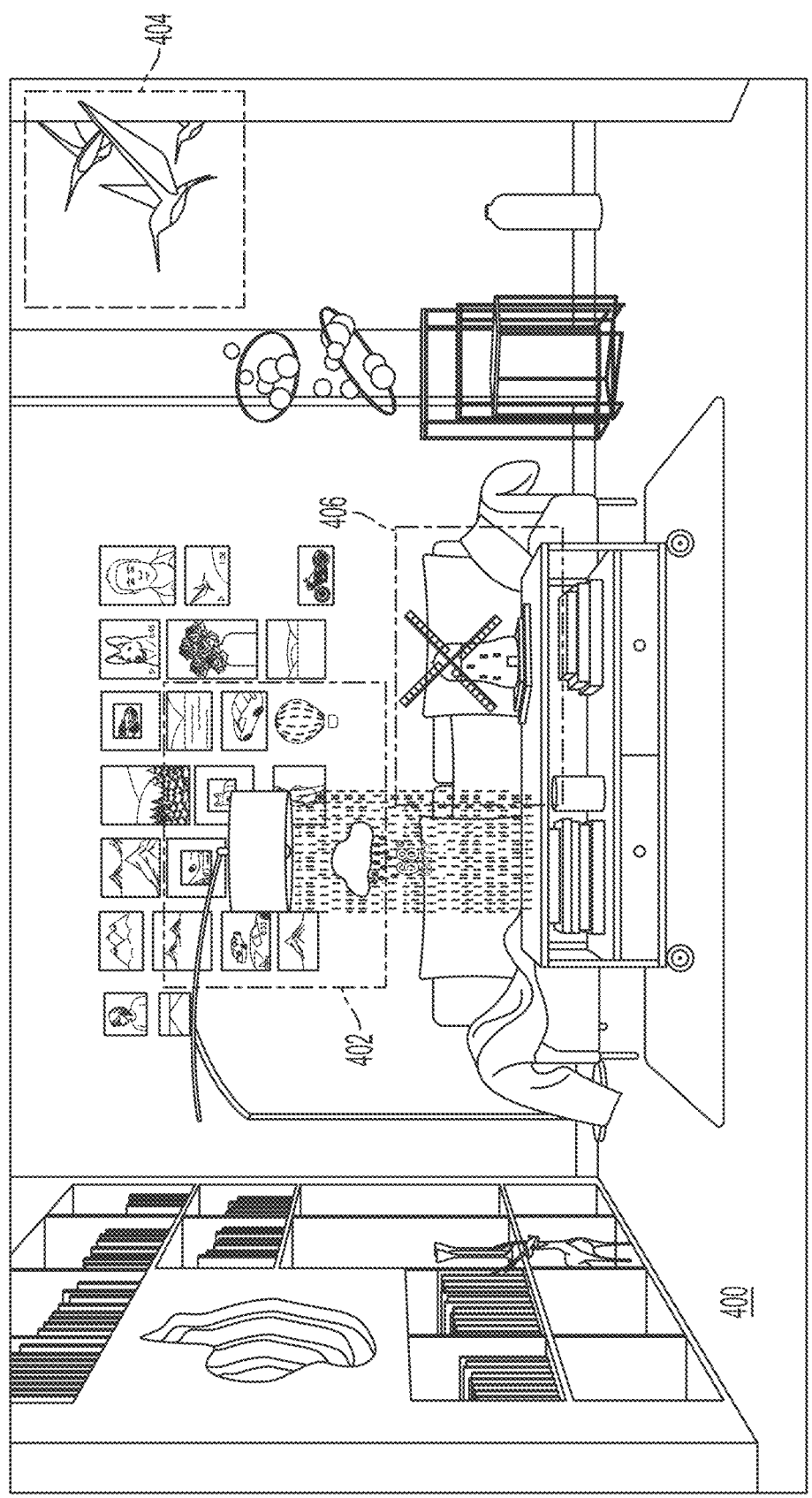
FIG. 2 is a sketch of an exemplary simplified AR scene, showing exemplary use cases of an XR system, according to some embodiments.

FIGS. 1 and 2 illustrate scenes with virtual content displayed in conjunction with a portion of the physical world. For purposes of illustration, an AR system is used as an example of an XR system. FIGS. 3-6B illustrate an exemplary AR system, including one or more processors, memory, sensors and user interfaces that may operate according to the techniques described herein.

Referring to FIG. 1, an outdoor AR scene 354 is depicted in which a user of an AR technology sees a physical world park-like setting 356, featuring people, trees, buildings in the background, and a concrete platform 358. In addition to these items, the user of the AR technology also perceives that they "see" a robot statue 357 standing upon the physical world concrete platform 358, and a cartoon-like avatar character 352 flying by which seems to be a personification of a bumble bee, even though these elements (e.g., the avatar character 352, and the robot statue 357) do not exist in the physical world. Due to the extreme complexity of the human visual perception and nervous system, it is challenging to produce an AR technology that facilitates a comfortable, natural-feeling, rich presentation of virtual image elements amongst other virtual or physical world imagery elements.

Such an AR scene may be achieved with a system that builds maps of the physical world based on tracking information, enable users to place AR content in the physical world, determine locations in the maps of the physical world where AR content are placed, preserve the AR scenes such that the placed AR content can be reloaded to display in the physical world during, for example, a different AR experience session, and enable multiple users to share an AR experience. The system may build and update a digital representation of the physical world surfaces around the user. This representation may be used to render virtual content so as to appear fully or partially occluded by physical objects between the user and the rendered location of the virtual content, to place virtual objects, in physics based interactions, and for virtual character path planning and navigation, or for other operations in which information about the physical world is used.

FIG. 2 depicts another example of an indoor AR scene 400, showing exemplary use cases of an XR system, according to some embodiments. The exemplary scene 400 is a living room having walls, a bookshelf on one side of a wall, a floor lamp at a corner of the room, a floor, a sofa, and coffee table on the floor. In addition to these physical items, the user of the AR technology also perceives virtual objects such as images on the wall behind the sofa, birds flying through the door, a deer peeking out from the book shelf, and a decoration in the form of a windmill placed on the coffee table.

For the images on the wall, the AR technology requires information about not only surfaces of the wall but also objects and surfaces in the room such as lamp shape, which are occluding the images to render the virtual objects correctly. For the flying birds, the AR technology requires information about all the objects and surfaces around the room for rendering the birds with realistic physics to avoid the objects and surfaces or bounce off them if the birds collide. For the deer, the AR technology requires information about the surfaces such as the floor or coffee table to compute where to place the deer. For the windmill, the system may identify that is an object separate from the table and may determine that it is movable, whereas corners of shelves or corners of the wall may be determined to be stationary. Such a distinction may be used in determinations as to which portions of the scene are used or updated in each of various operations.

The virtual objects may be placed in a previous AR experience session. When new AR experience sessions start in the living room, the AR technology requires the virtual objects being accurately displayed at the locations previously placed and realistically visible from different viewpoints. For example, the windmill should be displayed as standing on the books rather than drifting above the table at a different location without the books. Such drifting may happen if the locations of the users of the new AR experience sessions are not accurately localized in the living room. As another example, if a user is viewing the windmill from a viewpoint different from the viewpoint when the windmill was placed, the AR technology requires corresponding sides of the windmill being displayed.

A scene may be presented to the user via a system that includes multiple components, including a user interface that can stimulate one or more user senses, such as sight, sound, and/or touch. In addition, the system may include one or more sensors that may measure parameters of the physical portions of the scene, including position and/or motion of the user within the physical portions of the scene. Further, the system may include one or more computing devices, with associated computer hardware, such as memory. These components may be integrated into a single device or may be distributed across multiple interconnected devices. In some embodiments, some or all of these components may be integrated into a wearable device.

Figure 3:
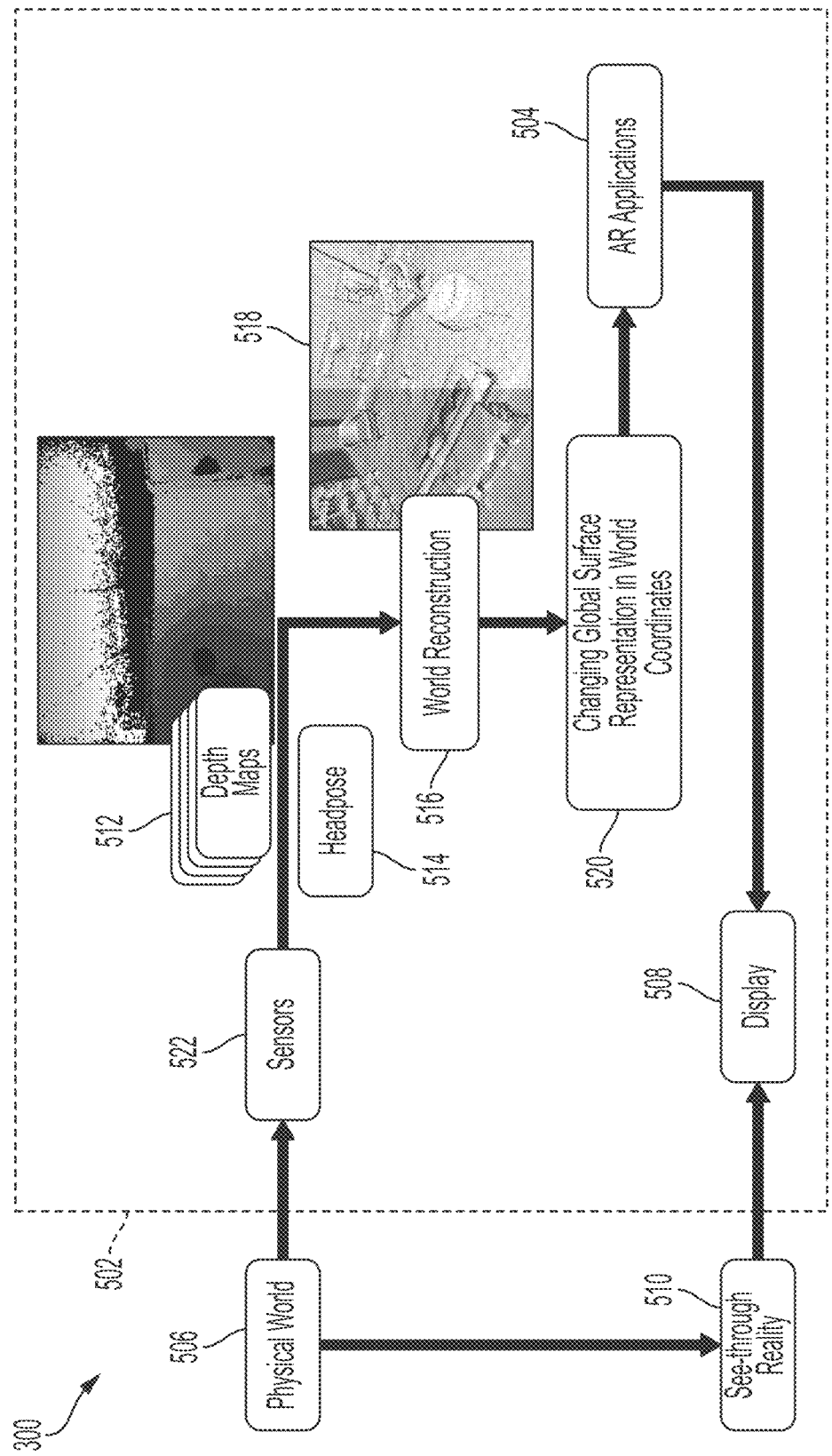
FIG. 3 is a schematic diagram illustrating data flow for a single user in an AR system configured to provide an experience to the user of AR content interacting with a physical world, according to some embodiments.

FIG. 3 depicts an AR system 502 configured to provide an experience of AR contents interacting with a physical world 506, according to some embodiments. The AR system 502 may include a display 508. In the illustrated embodiment, the display 508 may be worn by the user as part of a headset such that a user may wear the display over their eyes like a pair of goggles or glasses. At least a portion of the display may be transparent such that a user may observe a see-through reality 510. The see-through reality 510 may correspond to portions of the physical world 506 that are within a present viewpoint of the AR system 502, which may correspond to the viewpoint of the user in the case that the user is wearing a headset incorporating both the display and sensors of the AR system to acquire information about the physical world.

AR contents may also be presented on the display 508, overlaid on the see-through reality 510. To provide accurate interactions between AR contents and the see-through reality 510 on the display 508, the AR system 502 may include sensors 522 configured to capture information about the physical world 506.

The sensors 522 may include one or more depth sensors that output depth maps 512. Each depth map 512 may have multiple pixels, each of which may represent a distance to a surface in the physical world 506 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The sensors 522 may include other sensors, such as image sensors. The image sensors may acquire information such as monocular or stereoscopic information, which may be processed to represent the physical world in other ways. In some embodiments, the system may include other sensors such as, for example, one or more of the following: LiDAR cameras, RGBD cameras, infrared camera sensors, visible spectrum camera sensors, structured light emitters and/or sensors, infrared light emitters, coherent light emitters and/or sensors, gyroscopic sensors, accelerometers, magnetometers, altimeters, proximity sensors, GPS sensors, ultrasonic emitters and detectors, and haptic interfaces. The sensor data may be processed in world reconstruction component 516 to create a mesh, representing connected portions of objects in the physical world. Metadata about such objects, including for example, color and surface texture, may similarly be acquired with the sensors and stored as part of the world reconstruction. Metadata about a location of a device including the system may be determined or inferred based on the sensor data. For example magnetometers, altimeters, GPS sensors, and the like may be used to determine or infer the location of the device. The location of the device may be of varying degrees of granularity. For example, the accuracy of the determined location of the device may vary from coarse (e.g., accurate to 10 meter diameter sphere), to fine (e.g., accurate to a 3 meter diameter sphere), to extra fine (e.g., accurate to a 1 meter diameter sphere), to ultra fine (e.g., accurate to a 0.5 meter diameter sphere), etc.

The system may also acquire information about the headpose (or "pose") of the user with respect to the physical world. In some embodiments, a headpose tracking component of the system may be used to compute headposes in real time. The headpose tracking component may represent a headpose of a user in a coordinate frame with six degrees of freedom including, for example, translation in three perpendicular axes (e.g., forward/backward, up/down, left/right) and rotation about the three perpendicular axes (e.g., pitch, yaw, and roll). In some embodiments, sensors 522 may include inertial measurement units that may be used to compute and/or determine a headpose 514. A headpose 514 for a depth map may indicate a present viewpoint of a sensor capturing the depth map with six degrees of freedom, for example, but the headpose 514 may be used for other purposes, such as to relate image information to a particular portion of the physical world or to relate the position of the display worn on the user's head to the physical world.

In some embodiments, the headpose information may be derived in other ways than from an IMU, such as from analyzing objects in an image. For example, the headpose tracking component may compute relative position and orientation of an AR device to physical objects based on visual information captured by cameras and inertial information captured by IMUs. The headpose tracking component may then compute a headpose of the AR device by, for example, comparing the computed relative position and orientation of the AR device to the physical objects with features of the physical objects. In some embodiments, that comparison may be made by identifying features in images captured with one or more of the sensors 522 that are stable over time such that changes of the position of these features in images captured over time can be associated with a change in headpose of the user.

Techniques for operating an XR system may provide XR scenes for a more immersive user experience. In such a system, an XR device may estimate headpose at a frequency of 1 kHz, with low usage of computational resources. Such a device may be configured with, for example, four video graphic array (VGA) cameras operating at 30 Hz, one inertial measurement unit (IMU) operating at 1 kHz, compute power of a single advanced RISC machine (ARM) core, memory less than 1 GB, and network bandwidth less than 100 Mbp. Techniques as described herein may be employed to reduce processing required to generate and maintain maps and estimate headpose as well as to provide and consume data with low computational overhead. The XR system may calculate its pose based on the matched visual features. U.S. Patent Application Publication No. US 2019/0188474 describes hybrid tracking and is hereby incorporated herein by reference in its entirety.

In some embodiments, the AR device may construct a map from the feature points recognized in successive images in a series of image frames captured as a user moves throughout the physical world with the AR device. Though each image frame may be taken from a different pose as the user moves, the system may adjust the orientation of the features of each successive image frame to match the orientation of the initial image frame by matching features of the successive image frames to previously captured image frames. Translations of the successive image frames so that points representing the same features will match corresponding feature points from previously collected image frames, can be used to align each successive image frame to match the orientation of previously processed image frames. The frames in the resulting map may have a common orientation established when the first image frame was added to the map. This map, with sets of feature points in a common frame of reference, may be used to determine the user's pose within the physical world by matching features from current image frames to the map. In some embodiments, this map may be called a tracking map.

Alternatively or additionally, a map of a 3D environment around a user may be constructed by identifying planes or other surfaces based on image information. The position of these surfaces from image to image, may be correlated to create the representation. Techniques to efficiently optimize such a map, as described herein, may be used to form that map. Such a map may be used for positioning virtual objects with respect to the physical world, or for different or additional functions. For example, the 3D representation based on panes may be used for headpose tracking.

In addition to enabling tracking of the user's pose within the environment, this map may enable other components of the system, such as world reconstruction component 516, to determine the location of physical objects with respect to the user. The world reconstruction component 516 may receive the depth maps 512 and headposes 514, and any other data from the sensors, and integrate that data into a reconstruction 518. The reconstruction 518 may be more complete and less noisy than the sensor data. The world reconstruction component 516 may update the reconstruction 518 using spatial and temporal averaging of the sensor data from multiple viewpoints over time.

The reconstruction 518 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 518, portions of the physical world are presented as a global surface; on the right side of the reconstruction 518, portions of the physical world are presented as meshes.

In some embodiments, the map maintained by headpose component 514 may be sparse relative to other maps that might be maintained of the physical world. Rather than providing information about locations, and possibly other characteristics, of surfaces, the sparse map may indicate locations of interest points and/or structures, such as corners or edges. In some embodiments, the map may include image frames as captured by the sensors 522. These frames may be reduced to features, which may represent the interest points and/or structures. In conjunction with each frame, information about a pose of a user from which the frame was acquired may also be stored as part of the map. In some embodiments, every image acquired by the sensor may or may not be stored. In some embodiments, the system may process images as they are collected by sensors and select subsets of the image frames for further computation. The selection may be based on one or more criteria that limits the addition of information yet ensures that the map contains useful information. The system may add a new image frame to the map, for example, based on overlap with a prior image frame already added to the map or based on the image frame containing a sufficient number of features determined as likely to represent stationary objects. In some embodiments, the selected image frames, or groups of features from selected image frames may serve as key frames for the map, which are used to provide spatial information.

In some embodiments, the amount of data that is processed when constructing maps may be reduced, such as by constructing sparse maps with a collection of mapped points and keyframes and/or dividing the maps into blocks to enable updates by blocks. A mapped point may be associated with a point of interest in the environment. A keyframe may include selected information from camera-captured data. U.S. Patent Application Publication No. US 2020/0034624 describes determining and/or evaluating localization maps and is hereby incorporated herein by reference in its entirety.

The AR system 502 may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction of the physical world, which may serve as an abstract layer for the map and provide spatial information. The reconstruction may be more complete and less noisy than the original sensor data by using spatial and temporal averaging (i.e. averaging data from multiple viewpoints over time), or any other suitable method.

In the illustrated embodiment in FIG. 3, a map represents the portion of the physical world in which a user of a single, wearable device is present. In that scenario, headpose associated with frames in the map may be represented as a local headpose, indicating orientation relative to an initial orientation for a single device at the start of a session. For example, the headpose may be tracked relative to an initial headpose when the device was turned on or otherwise operated to scan an environment to build a representation of that environment.

In combination with content characterizing that portion of the physical world, the map may include metadata. The metadata, for example, may indicate time of capture of the sensor information used to form the map. Metadata alternatively or additionally may indicate location of the sensors at the time of capture of information used to form the map. Location may be expressed directly, such as with information from a GPS chip, or indirectly, such as with a wireless (e.g., Wi-Fi) signature indicating strength of signals received from one or more wireless access points while the sensor data was being collected and/or with identifiers, such as BSSID's, of wireless access points to which the user device connected while the sensor data was collected.

The reconstruction 518 may be used for AR functions, such as producing a surface representation of the physical world for occlusion processing or physics-based processing. This surface representation may change as the user moves or objects in the physical world change. Aspects of the reconstruction 518 may be used, for example, by a component 520 that produces a changing global surface representation in world coordinates, which may be used by other components.

The AR content may be generated based on this information, such as by AR applications 504. An AR application 504 may be a game program, for example, that performs one or more functions based on information about the physical world, such as visual occlusion, physics-based interactions, and environment reasoning. It may perform these functions by querying data in different formats from the reconstruction 518 produced by the world reconstruction component 516. In some embodiments, component 520 may be configured to output updates when a representation in a region of interest of the physical world changes. That region of interest, for example, may be set to approximate a portion of the physical world in the vicinity of the user of the system, such as the portion within the view field of the user, or is projected (predicted/determined) to come within the view field of the user.

The AR applications 504 may use this information to generate and update the AR contents. The virtual portion of the AR contents may be presented on the display 508 in combination with the see-through reality 510, creating a realistic user experience.

Figure 4:
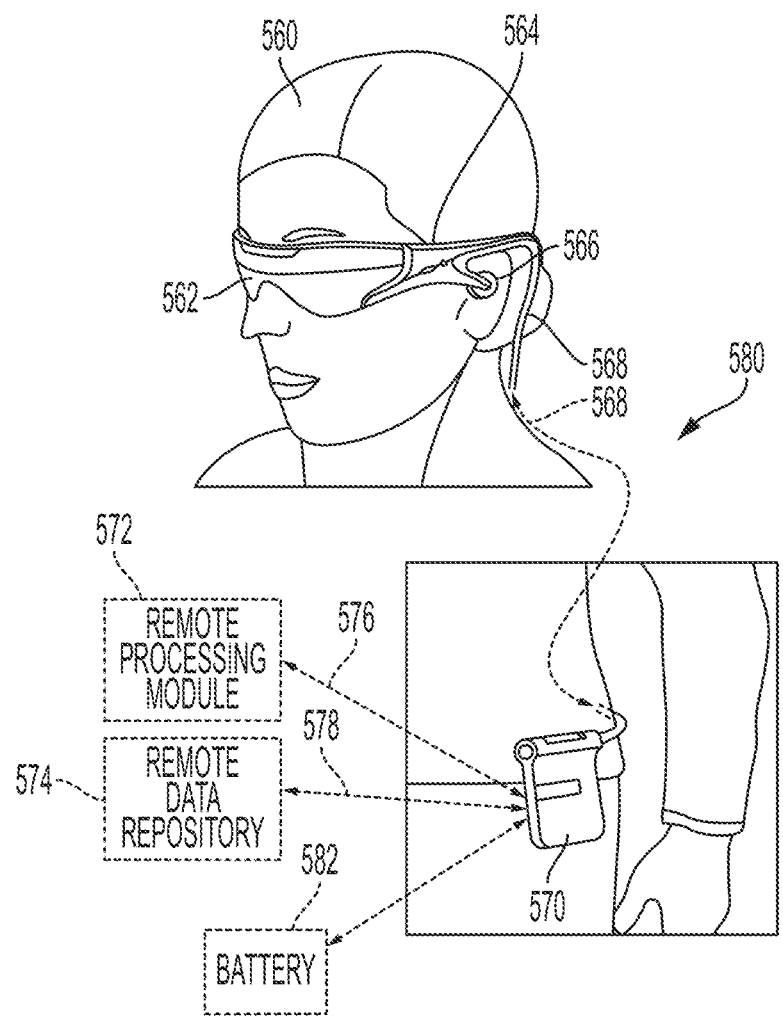
FIG. 4 is a schematic diagram illustrating an exemplary AR display system, displaying virtual content for a single user, according to some embodiments.

In some embodiments, an AR experience may be provided to a user through an XR device, which may be a wearable display device, which may be part of a system that may include remote processing and or remote data storage and/or, in some embodiments, other wearable display devices worn by other users. FIG. 4 illustrates an example of system 580 (hereinafter referred to as "system 580") including a single wearable device for simplicity of illustration. The system 580 includes a head mounted display device 562 (hereinafter referred to as "display device 562"), and various mechanical and electronic modules and systems to support the functioning of the display device 562. The display device 562 may be coupled to a frame 564, which is wearable by a display system user or viewer 560 (hereinafter referred to as "user 560") and configured to position the display device 562 in front of the eyes of the user 560. According to various embodiments, the display device 562 may be a sequential display. The display device 562 may be monocular or binocular. In some embodiments, the display device 562 may be an example of the display 508 in FIG. 3.

In some embodiments, a speaker 566 is coupled to the frame 564 and positioned proximate an ear canal of the user 560. In some embodiments, another speaker, not shown, is positioned adjacent another ear canal of the user 560 to provide for stereo/shapeable sound control. The display device 562 is operatively coupled, such as by a wired lead or wireless connectivity 568, to a local data processing module 570 which may be mounted in a variety of configurations, such as fixedly attached to the frame 564, fixedly attached to a helmet or hat worn by the user 560, embedded in headphones, or otherwise removably attached to the user 560 (e.g., in a backpack-style configuration, in a belt-coupling style configuration).

The local data processing module 570 may include a processor, as well as digital memory, such as non-volatile memory (e.g., flash memory), both of which may be utilized to assist in the processing, caching, and storage of data. The data include data a) captured from sensors (which may be, e.g., operatively coupled to the frame 564) or otherwise attached to the user 560, such as image capture devices (such as cameras), microphones, inertial measurement units, accelerometers, compasses, GPS units, radio devices, and/or gyros; and/or b) acquired and/or processed using remote processing module 572 and/or remote data repository 574, possibly for passage to the display device 562 after such processing or retrieval.

In some embodiments, the wearable deice may communicate with remote components. The local data processing module 570 may be operatively coupled by communication links 576, 578, such as via a wired or wireless communication links, to the remote processing module 572 and remote data repository 574, respectively, such that these remote modules 572, 574 are operatively coupled to each other and available as resources to the local data processing module 570. In further embodiments, in addition or as alternative to remote data repository 574, the wearable device can access cloud based remote data repositories, and/or services. In some embodiments, the headpose tracking component described above may be at least partially implemented in the local data processing module 570. In some embodiments, the world reconstruction component 516 in FIG. 3 may be at least partially implemented in the local data processing module 570. For example, the local data processing module 570 may be configured to execute computer executable instructions to generate the map and/or the physical world representations based at least in part on at least a portion of the data.

In some embodiments, processing may be distributed across local and remote processors. For example, local processing may be used to construct a map on a user device (e.g. tracking map) based on sensor data collected with sensors on that user's device. Such a map may be used by applications on that user's device. Additionally, previously created maps (e.g., canonical maps) may be stored in remote data repository 574. Where a suitable stored or persistent map is available, it may be used instead of or in addition to the tracking map created locally on the device. In some embodiments, a tracking map may be localized to the stored map, such that a correspondence is established between a tracking map, which might be oriented relative to a position of the wearable device at the time a user turned the system on, and the canonical map, which may be oriented relative to one or more persistent features. In some embodiments, the persistent map might be loaded on the user device to allow the user device to render virtual content without a delay associated with scanning a location to build a tracking map of the user's full environment from sensor data acquired during the scan. In some embodiments, the user device may access a remote persistent map (e.g., stored on a cloud) without the need to download the persistent map on the user device.

In some embodiments, spatial information may be communicated from the wearable device to remote services, such as a cloud service that is configured to localize a device to stored maps maintained on the cloud service. According to one embodiment, the localization processing can take place in the cloud matching the device location to existing maps, such as canonical maps, and return transforms that link virtual content to the wearable device location. In such embodiments, the system can avoid communicating maps from remote resources to the wearable device. Other embodiments can be configured for both device-based and cloud-based localization, for example, to enable functionality where network connectivity is not available or a user opts not to enable could-based localization.

Alternatively or additionally, the tracking map may be merged with previously stored maps to extend or improve the quality of those maps. The processing to determine whether a suitable previously created environment map is available and/or to merge a tracking map with one or more stored environment maps may be done in local data processing module 570 or remote processing module 572.

In some embodiments, the local data processing module 570 may include one or more processors (e.g., a graphics processing unit (GPU)) configured to analyze and process data and/or image information. In some embodiments, the local data processing module 570 may include a single processor (e.g., a single-core or multi-core ARM processor), which would limit the local data processing module 570's compute budget but enable a more miniature device. In some embodiments, the world reconstruction component 516 may use a compute budget less than a single Advanced RISC Machine (ARM) core to generate physical world representations in real-time on a non-predefined space such that the remaining compute budget of the single ARM core can be accessed for other uses such as, for example, extracting meshes.

Processing as described herein to optimize a map of a 3D environment may be performed in any processor of the system. However, the reduced computation and reduced memory required for optimization as described herein may enable such operations to be performed quickly and with low latency on local processors that are part of a wearable device.

In some embodiments, the remote data repository 574 may include a digital data storage facility, which may be available through the Internet or other networking configuration in a "cloud" resource configuration. In some embodiments, all data is stored and all computations are performed in the local data processing module 570, allowing fully autonomous use from a remote module. In some embodiments, all data is stored and all or most computations are performed in the remote data repository 574, allowing for a smaller device. A world reconstruction, for example, may be stored in whole or in part in this repository 574.

In embodiments in which data is stored remotely, and accessible over a network, data may be shared by multiple users of an augmented reality system. For example, user devices may upload their tracking maps to augment a database of environment maps. In some embodiments, the tracking map upload occurs at the end of a user session with a wearable device. In some embodiments, the tracking map uploads may occur continuously, semi-continuously, intermittently, at a pre-defined time, after a pre-defined period from the previous upload, or when triggered by an event. A tracking map uploaded by any user device may be used to expand or improve a previously stored map, whether based on data from that user device or any other user device. Likewise, a persistent map downloaded to a user device may be based on data from that user device or any other user device. In this way, high quality environment maps may be readily available to users to improve their experiences with the AR system.

In further embodiments, persistent map downloads can be limited and/or avoided based on localization executed on remote resources (e.g., in the cloud). In such configurations, a wearable device or other XR device communicates to the cloud service feature information coupled with pose information (e.g., positioning information for the device at the time the features represented in the feature information were sensed). One or more components of the cloud service may match the feature information to respective stored maps (e.g., canonical maps) and generates transforms between a tracking map maintained by the XR device and the coordinate system of the canonical map. Each XR device that has its tracking map localized with respect to the canonical map may accurately render virtual content in locations specified with respect to the canonical map based on its own tracking.

In some embodiments, the local data processing module 570 is operatively coupled to a battery 582. In some embodiments, the battery 582 is a removable power source, such as over the counter batteries. In other embodiments, the battery 582 is a lithium-ion battery. In some embodiments, the battery 582 includes both an internal lithium-ion battery chargeable by the user 560 during non-operation times of the system 580 and removable batteries such that the user 560 may operate the system 580 for longer periods of time without having to be tethered to a power source to charge the lithium-ion battery or having to shut the system 580 off to replace batteries.

Figure 5A:
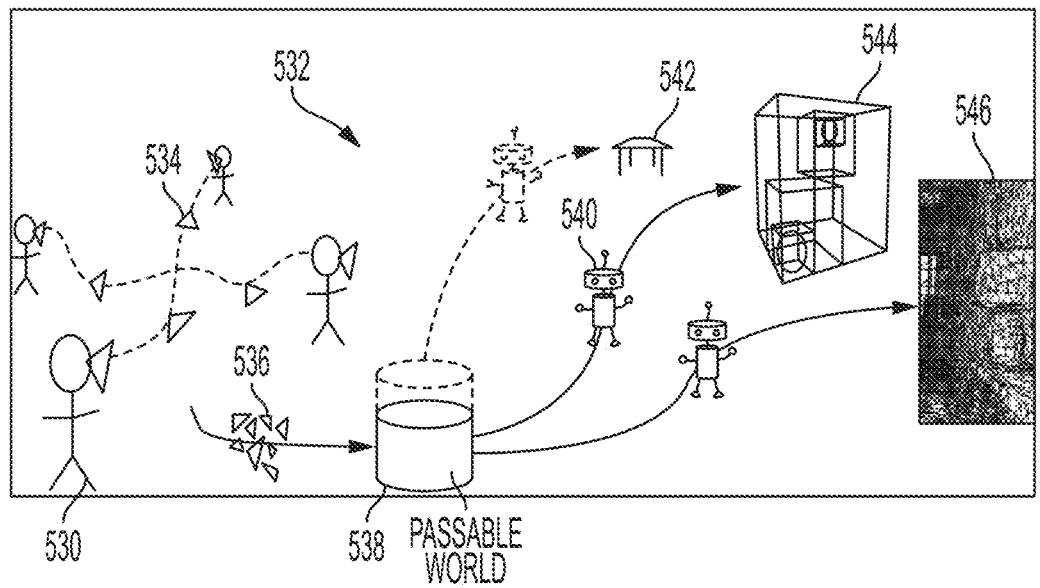
FIG. 5A is a schematic diagram illustrating a user wearing an AR display system rendering AR content as the user moves through a physical world environment, according to some embodiments.

FIG. 5A illustrates a user 530 wearing an AR display system rendering AR content as the user 530 moves through a physical world environment 532 (hereinafter referred to as "environment 532"). The information captured by the AR system along the movement path of the user may be processed into one or more tracking maps. The user 530 positions the AR display system at positions 534, and the AR display system records ambient information of a passable world (e.g., a digital representation of the real objects in the physical world that can be stored and updated with changes to the real objects in the physical world) relative to the positions 534. That information may be stored as poses in combination with images, features, directional audio inputs, or other desired data. The positions 534 are aggregated to data inputs 536, for example, as part of a tracking map, and processed at least by a passable world module 538, which may be implemented, for example, by processing on a remote processing module 572 of FIG. 4. In some embodiments, the passable world module 538 may include the headpose component 514 and the world reconstruction component 516, such that the processed information may indicate the location of objects in the physical world in combination with other information about physical objects used in rendering virtual content.

The passable world module 538 determines, at least in part, where and how AR content 540 can be placed in the physical world as determined from the data inputs 536. The AR content is "placed" in the physical world by presenting via the user interface both a representation of the physical world and the AR content, with the AR content rendered as if it were interacting with objects in the physical world and the objects in the physical world presented as if the AR content were, when appropriate, obscuring the user's view of those objects. In some embodiments, the AR content may be placed by appropriately selecting portions of a fixed element 542 (e.g., a table) from a reconstruction (e.g., the reconstruction 518) to determine the shape and position of the AR content 540. As an example, the fixed element may be a table and the virtual content may be positioned such that it appears to be on that table. In some embodiments, the AR content may be placed within structures in a field of view 544, which may be a present field of view or an estimated future field of view. In some embodiments, the AR content may be persisted relative to a model 546 of the physical world (e.g. a mesh).

As depicted, the fixed element 542 serves as a proxy (e.g. digital copy) for any fixed element within the physical world which may be stored in the passable world module 538 so that the user 530 can perceive content on the fixed element 542 without the system having to map to the fixed element 542 each time the user 530 sees it. The fixed element 542 may, therefore, be a mesh model from a previous modeling session or determined from a separate user but nonetheless stored by the passable world module 538 for future reference by a plurality of users. Therefore, the passable world module 538 may recognize the environment 532 from a previously mapped environment and display AR content without a device of the user 530 mapping all or part of the environment 532 first, saving computation process and cycles and avoiding latency of any rendered AR content.

The mesh model 546 of the physical world may be created by the AR display system and appropriate surfaces and metrics for interacting and displaying the AR content 540 can be stored by the passable world module 538 for future retrieval by the user 530 or other users without the need to completely or partially recreate the model. In some embodiments, the data inputs 536 are inputs such as geolocation, user identification, and current activity to indicate to the passable world module 538 which fixed element 542 of one or more fixed elements are available, which AR content 540 has last been placed on the fixed element 542, and whether to display that same content (such AR content being "persistent" content regardless of user viewing a particular passable world model).

Even in embodiments in which objects are considered to be fixed (e.g. a kitchen table), the passable world module 538 may update those objects in a model of the physical world from time to time to account for the possibility of changes in the physical world. The model of fixed objects may be updated with a very low frequency. Other objects in the physical world may be moving or otherwise not regarded as fixed (e.g. kitchen chairs). To render an AR scene with a realistic feel, the AR system may update the position of these non-fixed objects with a much higher frequency than is used to update fixed objects. To enable accurate tracking of all of the objects in the physical world, an AR system may draw information from multiple sensors, including one or more image sensors.

Figure 5B:
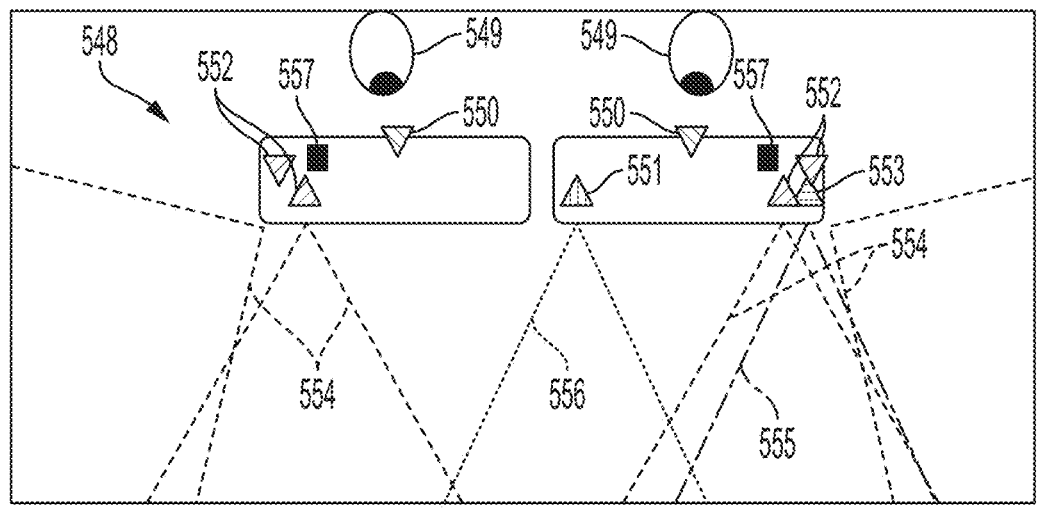
FIG. 5B is a schematic diagram illustrating a viewing optics assembly and attendant components, according to some embodiments.

FIG. 5B is a schematic illustration of a viewing optics assembly 548 and attendant components. In some embodiments, two eye tracking cameras 550, directed toward user eyes 549, detect metrics of the user eyes 549, such as eye shape, eyelid occlusion, pupil direction and glint on the user eyes 549.

In some embodiments, one of the sensors may be a depth sensor 551, such as a time of flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. Depth information, for example, may be obtained from stereoscopic visual image sensors or plenoptic sensors.

In some embodiments, world cameras 552 record a greater-than-peripheral view to map and/or otherwise create a model of the environment 532 and detect inputs that may affect AR content. In some embodiments, the world camera 552 and/or camera 553 may be grayscale and/or color image sensors, which may output grayscale and/or color image frames at fixed time intervals. Camera 553 may further capture physical world images within a field of view of the user at a specific time. Pixels of a frame-based image sensor may be sampled repetitively even if their values are unchanged. Each of the world cameras 552, the camera 553 and the depth sensor 551 have respective fields of view of 554, 555, and 556 to collect data from and record a physical world scene, such as the physical world environment 532 depicted in FIG. 34A.

Inertial measurement units 557 may determine movement and orientation of the viewing optics assembly 548. In some embodiments, inertial measurement units 557 may provide an output indicating a direction of gravity. In some embodiments, each component is operatively coupled to at least one other component. For example, the depth sensor 551 is operatively coupled to the eye tracking cameras 550 as a confirmation of measured accommodation against actual distance the user eyes 549 are looking at.

It should be appreciated that a viewing optics assembly 548 may include some of the components illustrated in FIG. 34B and may include components instead of or in addition to the components illustrated. In some embodiments, for example, a viewing optics assembly 548 may include two world camera 552 instead of four. Alternatively or additionally, cameras 552 and 553 need not capture a visible light image of their full field of view. A viewing optics assembly 548 may include other types of components. In some embodiments, a viewing optics assembly 548 may include one or more dynamic vision sensor (DVS), whose pixels may respond asynchronously to relative changes in light intensity exceeding a threshold.

In some embodiments, a viewing optics assembly 548 may not include the depth sensor 551 based on time of flight information. In some embodiments, for example, a viewing optics assembly 548 may include one or more plenoptic cameras, whose pixels may capture light intensity and an angle of the incoming light, from which depth information can be determined. For example, a plenoptic camera may include an image sensor overlaid with a transmissive diffraction mask (TDM). Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 551.

It also should be appreciated that the configuration of the components in FIG. 5B is provided as an example. A viewing optics assembly 548 may include components with any suitable configuration, which may be set to provide the user with the largest field of view practical for a particular set of components. For example, if a viewing optics assembly 548 has one world camera 552, the world camera may be placed in a center region of the viewing optics assembly instead of at a side.

Information from the sensors in viewing optics assembly 548 may be coupled to one or more of processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. In some embodiments, the image data may only include virtual content that may be modified such that the virtual content is perceived by a user as realistically interacting with the physical world (e.g. clip content to account for occlusions), when viewed through the user interface.

The location on the viewing optics assembly 548 at which content is displayed to create the impression of an object at a particular location may depend on the physics of the viewing optics assembly. Additionally, the pose of the user's head with respect to the physical world and the direction in which the user's eyes are looking may impact where in the physical world content displayed at a particular location on the viewing optics assembly content will appear. Sensors as described above may collect this information, and or supply information from which this information may be calculated, such that a processor receiving sensor inputs may compute where objects should be rendered on the viewing optics assembly 548 to create a desired appearance for the user.

Regardless of how content is presented to a user, a model of the physical world may be used so that characteristics of the virtual objects, which can be impacted by physical objects, including the shape, position, motion, and visibility of the virtual object, can be correctly computed. In some embodiments, the model may include the reconstruction of a physical world, for example, the reconstruction 518.

That model may be created from data collected from sensors on a wearable device of the user. Though, in some embodiments, the model may be created from data collected by multiple users, which may be aggregated in a computing device remote from all of the users (and which may be "in the cloud").

Figure 6A:
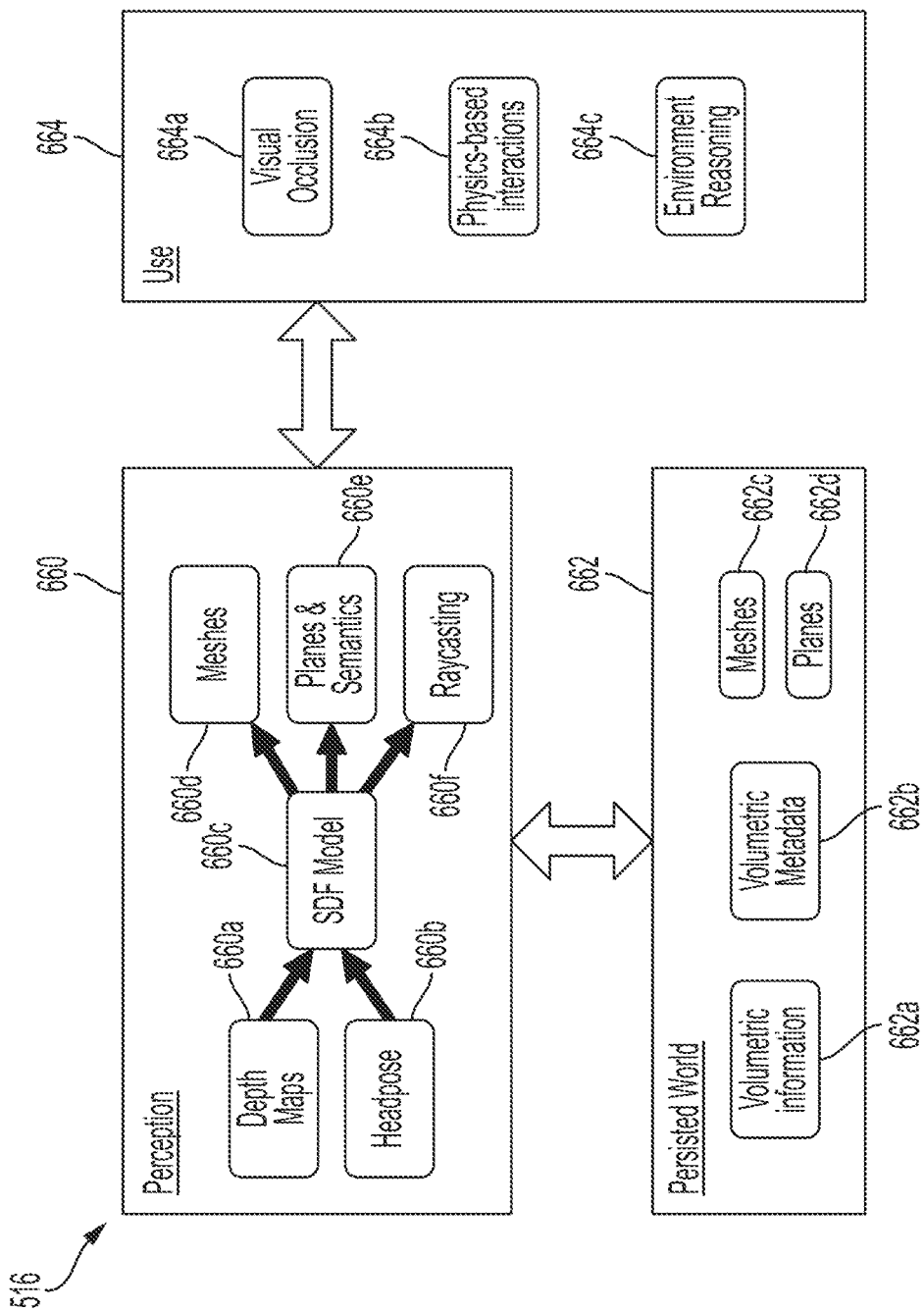
FIG. 6A is a schematic diagram illustrating an AR system using a world reconstruction system, according to some embodiments.

The model may be created, at least in part, by a world reconstruction system such as, for example, the world reconstruction component 516 of FIG. 3 depicted in more detail in FIG. 6A. The world reconstruction component 516 may include a perception module 660 that may generate, update, and store representations for a portion of the physical world. In some embodiments, the perception module 660 may represent the portion of the physical world within a reconstruction range of the sensors as multiple voxels. Each voxel may correspond to a 3D cube of a predetermined volume in the physical world, and include surface information, indicating whether there is a surface in the volume represented by the voxel. Voxels may be assigned values indicating whether their corresponding volumes have been determined to include surfaces of physical objects, determined to be empty or have not yet been measured with a sensor and so their value is unknown. It should be appreciated that values indicating that voxels that are determined to be empty or unknown need not be explicitly stored, as the values of voxels may be stored in computer memory in any suitable way, including storing no information for voxels that are determined to be empty or unknown.

In addition to generating information for a persisted world representation, the perception module 660 may identify and output indications of changes in a region around a user of an AR system. Indications of such changes may trigger updates to volumetric data stored as part of the persisted world, or trigger other functions, such as triggering components 604 that generate AR content to update the AR content.

In some embodiments, the perception module 660 may identify changes based on a signed distance function (SDF) model. The perception module 660 may be configured to receive sensor data such as, for example, depth maps 660a and headposes 660b, and then fuse the sensor data into a SDF model 660c. Depth maps 660a may provide SDF information directly, and images may be processed to arrive at SDF information. The SDF information represents distance from the sensors used to capture that information. As those sensors may be part of a wearable unit, the SDF information may represent the physical world from the perspective of the wearable unit and therefore the perspective of the user. The headposes 660b may enable the SDF information to be related to a voxel in the physical world.

In some embodiments, the perception module 660 may generate, update, and store representations for the portion of the physical world that is within a perception range. The perception range may be determined based, at least in part, on a sensor's reconstruction range, which may be determined based, at least in part, on the limits of a sensor's observation range. As a specific example, an active depth sensor that operates using active IR pulses may operate reliably over a range of distances, creating the observation range of the sensor, which may be from a few centimeters or tens of centimeters to a few meters.

The world reconstruction component 516 may include additional modules that may interact with the perception module 660. In some embodiments, a persisted world module 662 may receive representations for the physical world based on data acquired by the perception module 660. The persisted world module 662 also may include various formats of representations of the physical world. For example, volumetric metadata 662b such as voxels may be stored as well as meshes 662c and planes 662d. In some embodiments, other information, such as depth maps could be saved.

In some embodiments, representations of the physical world, such as those illustrated in FIG. 6A may provide relatively dense information about the physical world in comparison to sparse maps, such as a tracking map based on feature points as described above.

In some embodiments, the perception module 660 may include modules that generate representations for the physical world in various formats including, for example, meshes 660d, planes and semantics 660e. The representations for the physical world may be stored across local and remote storage mediums. The representations for the physical world may be described in different coordinate frames depending on, for example, the location of the storage medium. For example, a representation for the physical world stored in the device may be described in a coordinate frame local to the device. The representation for the physical world may have a counterpart stored in a cloud. The counterpart in the cloud may be described in a coordinate frame shared by all devices in an XR system.

In some embodiments, these modules may generate representations based on data within the perception range of one or more sensors at the time the representation is generated as well as data captured at prior times and information in the persisted world module 662. In some embodiments, these components may operate on depth information captured with a depth sensor. However, the AR system may include vision sensors and may generate such representations by analyzing monocular or binocular vision information.

In some embodiments, these modules may operate on regions of the physical world. Those modules may be triggered to update a subregion of the physical world, when the perception module 660 detects a change in the physical world in that subregion. Such a change, for example, may be detected by detecting a new surface in the SDF model 660c or other criteria, such as changing the value of a sufficient number of voxels representing the subregion.

The world reconstruction component 516 may include components 664 that may receive representations of the physical world from the perception module 660. Information about the physical world may be pulled by these components according to, for example, a use request from an application. In some embodiments, information may be pushed to the use components, such as via an indication of a change in a pre-identified region or a change of the physical world representation within the perception range. The components 664, may include, for example, game programs and other components that perform processing for visual occlusion, physics-based interactions, and environment reasoning.

Responding to the queries from the components 664, the perception module 660 may send representations for the physical world in one or more formats. For example, when the component 664 indicates that the use is for visual occlusion or physics-based interactions, the perception module 660 may send a representation of surfaces. When the component 664 indicates that the use is for environmental reasoning, the perception module 660 may send meshes, planes and semantics of the physical world.

In some embodiments, the perception module 660 may include components that format information to provide the component 664. An example of such a component may be raycasting component 660f. A use component (e.g., component 664), for example, may query for information about the physical world from a particular point of view. Raycasting component 660f may select from one or more representations of the physical world data within a field of view from that point of view.

As should be appreciated from the foregoing description, the perception module 660, or another component of an AR system, may process data to create 3D representations of portions of the physical world. Data to be processed may be reduced by culling parts of a 3D reconstruction volume based at last in part on a camera frustum and/or depth image, extracting and persisting plane data, capturing, persisting, and updating 3D reconstruction data in blocks that allow local update while maintaining neighbor consistency, providing occlusion data to applications generating such scenes, where the occlusion data is derived from a combination of one or more depth data sources, and/or performing a multistage mesh simplification. The reconstruction may contain data of different levels of sophistication including, for example, raw data such as live depth data, fused volumetric data such as voxels, and computed data such as meshes.

In some embodiments, components of a passable world model may be distributed, with some portions executing locally on an XR device and some portions executing remotely, such as on a network connected server, or otherwise in the cloud. The allocation of the processing and storage of information between the local XR device and the cloud may impact functionality and user experience of an XR system. For example, reducing processing on a local device by allocating processing to the cloud may enable longer battery life and reduce heat generated on the local device. But, allocating too much processing to the cloud may create undesirable latency that causes an unacceptable user experience.

Figure 6B:
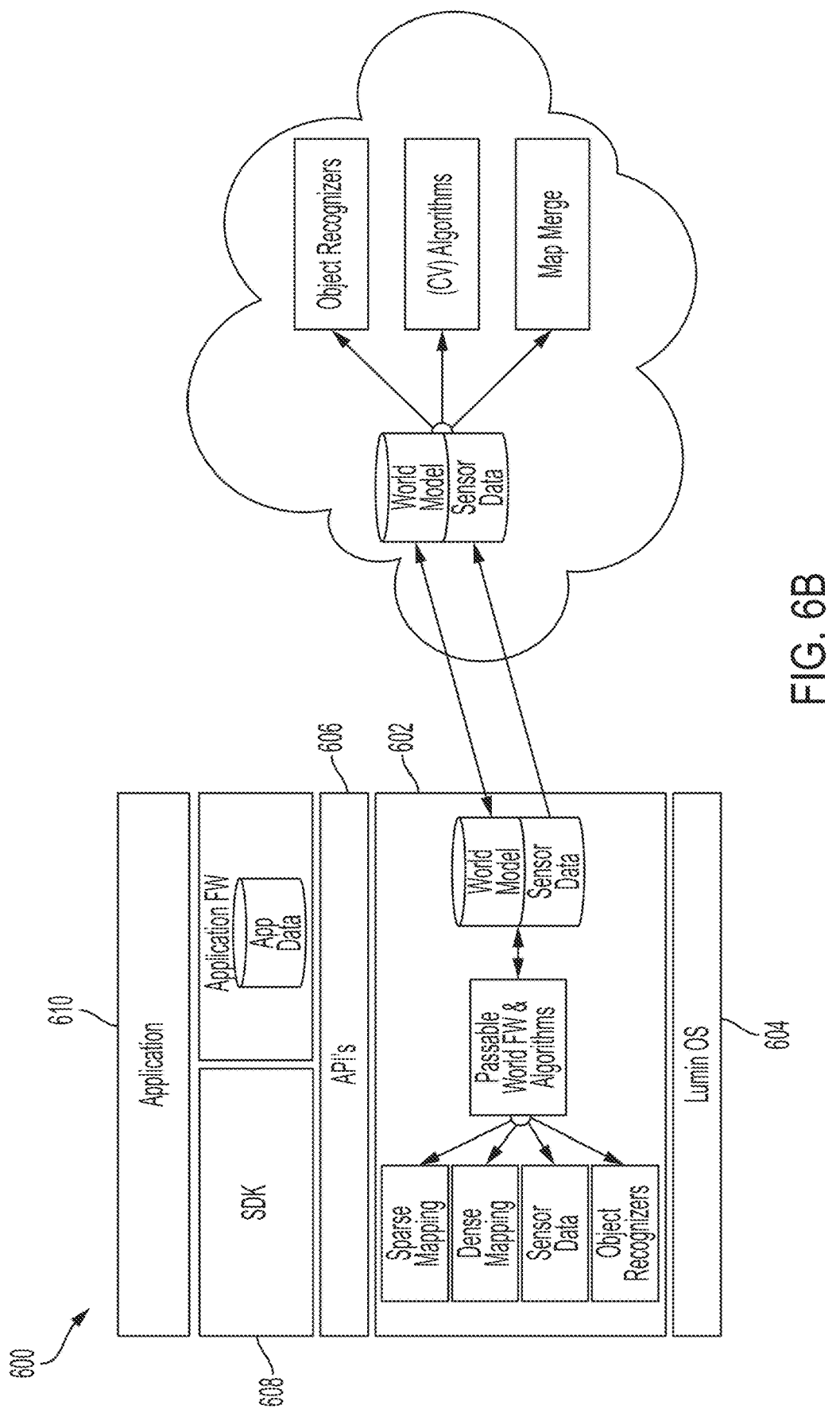
FIG. 6B is a schematic diagram illustrating components of an AR system that maintain a model of a passable world, according to some embodiments.

FIG. 6B depicts a distributed component architecture 600 configured for spatial computing, according to some embodiments. The distributed component architecture 600 may include a passable world component 602 (e.g., PW 538 in FIG. 5A), a Lumin OS 604, API's 606, SDK 608, and Application 610. The Lumin OS 604 may include a Linux-based kernel with custom drivers compatible with an XR device. The API's 606 may include application programming interfaces that grant XR applications (e.g., Applications 610) access to the spatial computing features of an XR device. The SDK 608 may include a software development kit that allows the creation of XR applications.

One or more components in the architecture 600 may create and maintain a model of a passable world. In this example sensor data is collected on a local device. Processing of that sensor data may be performed in part locally on the XR device and partially in the cloud. PW 538 may include environment maps created based, at least in part, on data captured by AR devices worn by multiple users. During sessions of an AR experience, individual AR devices (such as wearable devices described above in connection with FIG. 4 may create tracking maps, which is one type of map.

In some embodiments, the device may include components that construct both sparse maps and dense maps. A tracking map may serve as a sparse map and may include headposes of the AR device scanning an environment as well as information about objects detected within that environment at each headpose. Those headposes may be maintained locally for each device. For example, the headpose on each device may be relative to an initial headpose when the device was turned on for its session. As a result, each tracking map may be local to the device creating it and may have its own frame of reference defined by its own local coordinate system. In some embodiments, however, the tracking map on each device may be formed such that one coordinate of its local coordinate system is aligned with the direction of gravity as measured by its sensors, such as inertial measurement unit 557.

The dense map may include surface information, which may be represented by a mesh or depth information. Alternatively or additionally, a dense map may include higher level information derived from surface or depth information, such as the location and/or characteristics of planes and/or other objects.

Creation of the dense maps may be independent of the creation of sparse maps, in some embodiments. The creation of dense maps and sparse maps, for example, may be performed in separate processing pipelines within an AR system. Separating processing, for example, may enable generation or processing of different types of maps to be performed at different rates. Sparse maps, for example, may be refreshed at a faster rate than dense maps. In some embodiments, however, the processing of dense and sparse maps may be related, even if performed in different pipelines. Changes in the physical world revealed in a sparse map, for example, may trigger updates of a dense map, or vice versa. Further, even if independently created, the maps might be used together. For example, a coordinate system derived from a sparse map may be used to define position and/or orientation of objects in a dense map.

The sparse map and/or dense map may be persisted for re-use by the same device and/or sharing with other devices. Such persistence may be achieved by storing information in the cloud. The AR device may send the tracking map to a cloud to, for example, merge with environment maps selected from persisted maps previously stored in the cloud. In some embodiments, the selected persisted maps may be sent from the cloud to the AR device for merging. In some embodiments, the persisted maps may be oriented with respect to one or more persistent coordinate frames. Such maps may serve as canonical maps, as they can be used by any of multiple devices. In some embodiments, a model of a passable world may comprise or be created from one or more canonical maps. Devices, even though they perform some operations based on a coordinate frame local to the device, may nonetheless use the canonical map by determining a transformation between their coordinate frame local to the device and the canonical map.

A canonical map may originate as a tracking map (TM) (e.g., TM 1102 in FIG. 31A), which may be promoted to a canonical map. The canonical map may be persisted such that devices that access the canonical map may, once determining a transformation between their local coordinate system and a coordinate system of the canonical map, use the information in the canonical map to determine locations of objects represented in the canonical map in the physical world around the device. In some embodiments, a TM may be a headpose sparse map created by an XR device. In some embodiments, the canonical map may be created when an XR device sends one or more TMs to a cloud server for merging with additional TMs captured by the XR device at a different time or by other XR devices.

In embodiments in which tracking maps are formed on local devices with one coordinate of a local coordinate frame aligned with gravity, this orientation with respect to gravity may be preserved upon creation of a canonical map. For example, when a tracking map that is submitted for merging does not overlap with any previously stored map, that tracking map may be promoted to a canonical map. Other tracking maps, which may also have an orientation relative to gravity, may be subsequently merged with that canonical map. The merging may be done so as to ensure that the resulting canonical map retains its orientation relative to gravity. Two maps, for example, may not be merged, regardless of correspondence of feature points in those maps, if coordinates of each map aligned with gravity do not align with each other with a sufficiently close tolerance.

Figure 7:
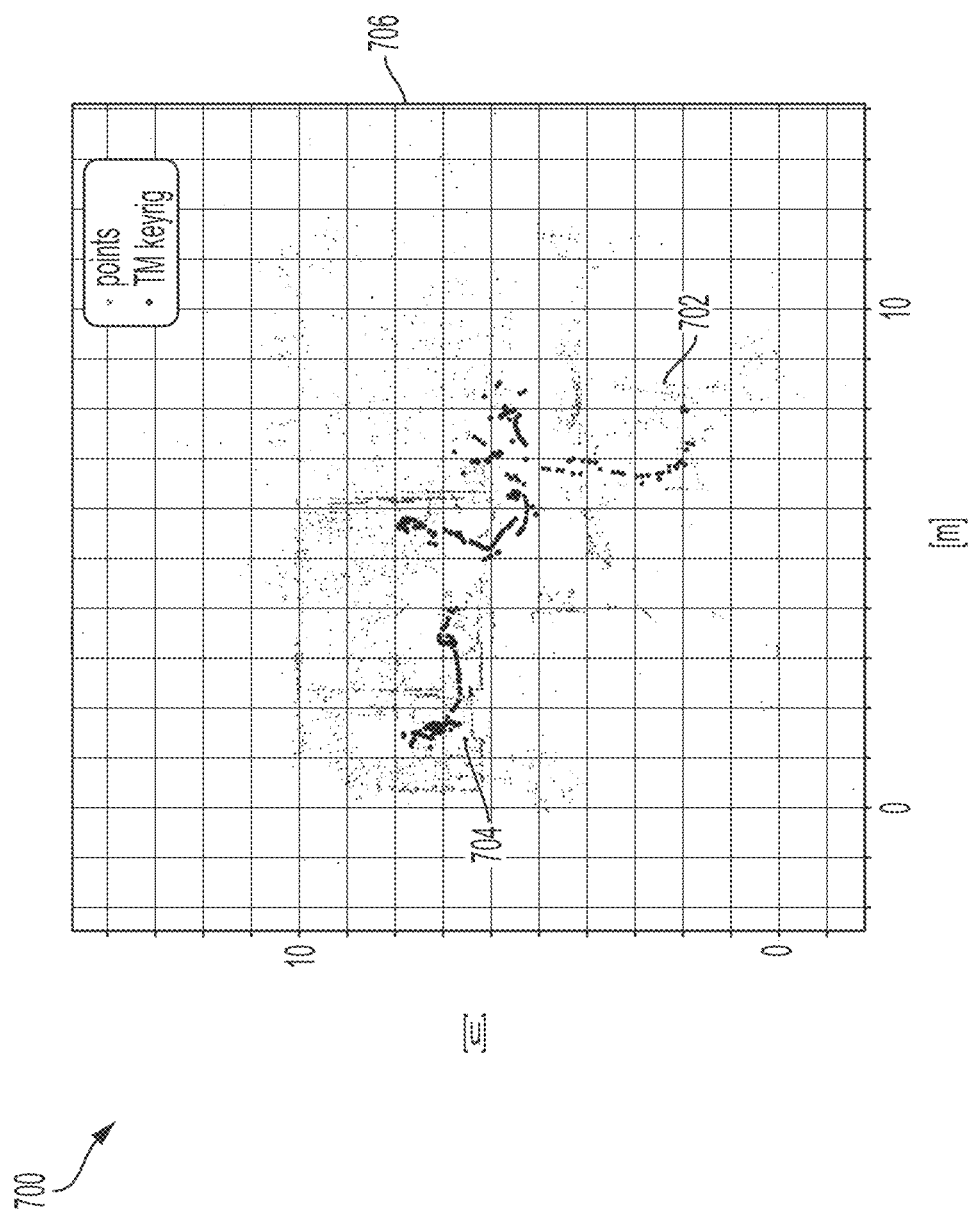
FIG. 7 is a schematic illustration of a tracking map formed by a device traversing a path through a physical world, according to some embodiments.

The canonical maps, or other maps, may provide information about the portions of the physical world represented by the data processed to create respective maps. FIG. 7 depicts an exemplary tracking map 700, according to some embodiments. The tracking map 700 may provide a floor plan 706 of physical objects in a corresponding physical world, represented by points 702. In some embodiments, a map point 702 may represent a feature of a physical object that may include multiple features. For example, each corner of a table may be a feature that is represented by a point on a map. The features may be derived from processing images, such as may be acquired with the sensors of a wearable device in an augmented reality system. The features, for example, may be derived by processing an image frame output by a sensor to identify features based on large gradients in the image or other suitable criteria. Further processing may limit the number of features in each frame. For example, processing may select features that likely represent persistent objects. One or more heuristics may be applied for this selection.

The tracking map 700 may include data on points 702 collected by a device. For each image frame with data points included in a tracking map, a pose may be stored. The pose may represent the orientation from which the image frame was captured, such that the feature points within each image frame may be spatially correlated. The pose may be determined by positioning information, such as may be derived from the sensors, such as an IMU sensor, on the wearable device. Alternatively or additionally, the pose may be determined from matching image frames to other image frames that depict overlapping portions of the physical world. By finding such positional correlation, which may be accomplished by matching subsets of features points in two frames, the relative pose between the two frames may be computed. A relative pose may be adequate for a tracking map, as the map may be relative to a coordinate system local to a device established based on the initial pose of the device when construction of the tracking map was initiated.

Not all of the feature points and image frames collected by a device may be retained as part of the tracking map, as much of the information collected with the sensors is likely to be redundant. Rather, only certain frames may be added to the map. Those frames may be selected based on one or more criteria, such as degree of overlap with image frames already in the map, the number of new features they contain or a quality metric for the features in the frame. Image frames not added to the tracking map may be discarded or may be used to revise the location of features. As a further alternative, all or most of the image frames, represented as a set of features may be retained, but a subset of those frames may be designated as key frames, which are used for further processing.

The key frames may be processed to produce keyrigs 704. The key frames may be processed to produce three dimensional sets of feature points and saved as keyrigs 704. Such processing may entail, for example, comparing image frames derived simultaneously from two cameras to stereoscopically determine the 3D position of feature points. Metadata may be associated with these keyframes and/or keyrigs, such as poses.

The environment maps may have any of multiple formats depending on, for example, the storage locations of an environment map including, for example, local storage of AR devices and remote storage. For example, a map in remote storage may have higher resolution than a map in local storage on a wearable device where memory is limited. To send a higher resolution map from remote storage to local storage, the map may be down sampled or otherwise converted to an appropriate format, such as by reducing the number of poses per area of the physical world stored in the map and/or the number of feature points stored for each pose. In some embodiments, a slice or portion of a high resolution map from remote storage may be sent to local storage, where the slice or portion is not down sampled.

A database of environment maps may be updated as new tracking maps are created. To determine which of a potentially very large number of environment maps in a database is to be updated, updating may include efficiently selecting one or more environment maps stored in the database relevant to the new tracking map. The selected one or more environment maps may be ranked by relevance and one or more of the highest ranking maps may be selected for processing to merge higher ranked selected environment maps with the new tracking map to create one or more updated environment maps. When a new tracking map represents a portion of the physical world for which there is no preexisting environment map to update, that tracking map may be stored in the database as a new environment map.

Techniques for Efficient Processing of Maps with Planes

FIG. 7 illustrates a map based on feature points. Some systems may create a map based on recognized surfaces, such as planes, rather than individual points. In some embodiments, rather than containing map points 702, the map may contain planes. For example, such a map may contain a plane to represent a table top, rather than a collection of feature points representing corners of the table and possibly points on the surface.

The processing of creating/updating such a map may include computing features of planes (such as position and orientation) in images acquired from various poses. The determination of the poses may, however, depend on the estimated features of planes previously detected. Therefore, creating and updating a map may entail jointly optimizing estimated features describing the planes and sensor poses from which images, used to estimate the features of the planes, were captured. The joint optimization may be referred to as planar bundle adjustment.

The inventors have recognized and appreciated that conventional approaches to planar bundle adjustment that applies to a map with one or more planar features can result in a large-scale nonlinear least-square problem, which incurs high computational cost and memory consumption. Unlike bundle adjustment conventionally performed for maps represented by feature points in which one recording of a sensor can yield a single observation of a point featuret, a planar feature may be an infinite object, and one image from a sensor can provide multiple observations of a planar feature. Each observation of the planar feature may put a constraint on plane parameters of the planar feature and pose parameters of the poses, resulting in a large-scale nonlinear least-square problem even for a small workplace.

Figure 8A:
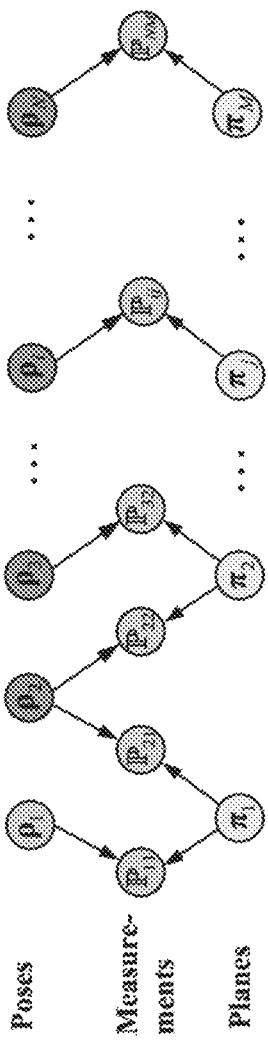
FIG. 8A is a schematic illustrating observations of various planes at different poses, according to some embodiments.

The inventors have recognized and appreciated a planar bundle adjustment that reduces the computational cost and memory usage. FIG. 8A is a schematic illustrating observations of various planes at different poses, according to some embodiments. In the illustrated example, there are M planes and N sensor poses. Denote the rotation and translation of the ith pose as $R_i \in SO_3$ and $t_i \in R^3$. Suppose the jth plane has the parameters as $\pi_j = [n_j; d_j]$, where n is the plane normal with $\|n\|_2 = 1$ and d is the negative distance from the coordinate system origin to the plane. The measurements of the jth plane at the ith pose are a set of $K_{ij}$ points defined as:

$$\mathbb{P}_{ij} = \{p_{ijk}\}_{k=1}^{K_{ij}} \qquad (6)$$

Figure 8B:
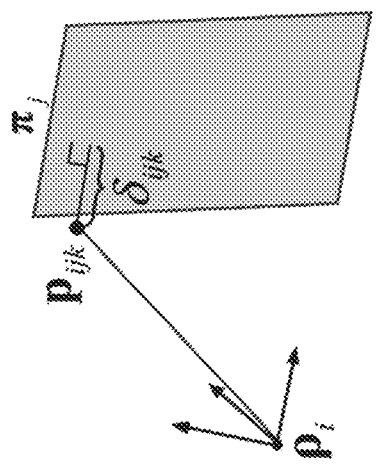
FIG. 8B is a schematic illustrating geometric entities involved in computing refined poses and plane parameters of a representation of an environment comprising the planes of FIG. 8A observed at the poses of FIG. 8A, according to some embodiments.

Each $p_{ijk} \in \mathbb{P}_{ij}$ provides one constraint on the ith pose and jth plane, which is illustrated in FIG. 8B. The residual $\delta_{ijk}$ is the signed distance from $p_{ijk}$ to plane $\pi_j$ which can be written as $$\delta_{ijk} = n_j \cdot (R_i p_{ijk} + t_i) + d_j, \qquad (7)$$

Unlike $t_i$, the rotation $R_i$ and plane parameters $\pi_j$ have extra constraints. For instance, $R_i$ can be parameterized by quaternion, angle-axis or Euler angle. The plane parameters $\pi_j$ can be represented by homogeneous coordinates, closest point parameterization or the minimal parameterization based on quaternion. Regardless of a special parameterization, this example defines $\theta_i \rightarrow R(\theta_i)$ and $\omega_j \rightarrow \pi(\omega_j)$ to present arbitrary parameterization for rotation and plane parameters. $\theta_i$ and $t_i$ are related to the sensor pose, which may be combined as $\rho_i = [\theta_i; t_i]$. $\rho_i$ may have 6 or 7 unknowns, changed with respect to the parameterization of the rotation matrix (7 for the quaternion and 6 for minimal representations of the rotation, such as the angle-axis parameterization). $\omega_j$ may have 3 or 4 unknowns (3 for minimal representations of a plane and 4 for the homogeneous coordinates of a plane). Using these notation, the residual $\delta_{ijk}$ is a function of $\rho_i$ and $\omega_j$.

The planar bundle adjustment may be the problem of jointly refining all $\rho_i (i \neq 1)$ and $\omega_j$ by minimizing the following nonlinear least-squares problem $$\min_{\substack{\rho_i, \omega_j \\ i \neq 1}} \sum_i \sum_j \sum_k \delta_{ijk}^2 (\rho_i, \omega_j). \qquad (8)$$

Here the first pose $\rho_1$ is fixed during the optimization to anchor the coordinate system rigidly.

The Jacobian Matrix of the planar bundle adjustment may be computed, and may be provided to an algorithm that solves least-squares problem (e.g., the Levenberg-Marquardt (LM) algorithm, and the Gaussian-Newton algorithm). The observation of the jth plane at the ith pose is a point set $P_{ij}$. The Jacobian matrix $J_{ij}$ may be derived from the point set $P_{ij}$. The Jacobian matrix J may be the stack of all $J_{ij}$. Assume there are $K_{ij}$ points in $P_{ij}$. The $J_{ij}$ ($i \neq 1$) has the form as $$J_{ij} = \begin{bmatrix} 0 & \cdots & \overbrace{\dfrac{\partial \delta_{ij1}}{\partial \rho_i}}^{ith\ pose} & \cdots & 0 & \cdots & \overbrace{\dfrac{\partial \delta_{ij1}}{\partial \omega_j}}^{jth\ plane} & \cdots & 0 \\ 0 & \cdots & \dfrac{\partial \delta_{ij2}}{\partial \rho_i} & \cdots & 0 & \cdots & \dfrac{\partial \delta_{ij2}}{\partial \omega_j} & \cdots & 0 \\ \vdots & \ddots & \vdots & \ddots & \vdots & \ddots & \vdots & \ddots & \vdots \\ 0 & \cdots & \dfrac{\partial \delta_{ijK_{ij}}}{\partial \rho_i} & \cdots & 0 & \cdots & \dfrac{\partial \delta_{ijK_{ij}}}{\partial \omega_j} & \cdots & 0 \\ & & \underbrace{\phantom{XXXXXXXX}}_{N-1\ pose} & & & & \underbrace{\phantom{XXXXXX}}_{M\ plane} & & \end{bmatrix} \qquad (9)$$

The partial derivatives of $\delta_{ijk}$, $$\dfrac{\partial \delta_{ijk}}{\partial \rho_i} \text{ and } \dfrac{\partial \delta_{ijk}}{\partial \omega_j},$$

may be computed based on the form of the residual $\delta_{ijk}$ in (7). It may be defined that $$R_i = \begin{bmatrix} R_i^{1,1} & R_i^{1,2} & R_i^{1,3} \\ R_i^{2,1} & R_i^{2,2} & R_i^{2,3} \\ R_i^{3,1} & R_i^{3,2} & R_i^{3,3} \end{bmatrix}, t_i = \begin{bmatrix} t_i^1 \\ t_i^2 \\ t_i^3 \end{bmatrix}, n_j = \begin{bmatrix} n_j^1 \\ n_j^2 \\ n_j^3 \end{bmatrix}, p_{ijk} = \begin{bmatrix} x_{ijk} \\ y_{ijk} \\ z_{ijk} \end{bmatrix}. \quad (10)$$

It is noted that the elements of $R_i$ defined above are functions of $\theta_i$, and $d_j$ and the elements of $n_j$ are functions of $\omega_j$. $p_{ijk}$ may represent the kth measurement of the jth plane at the ith pose. $x_{ijk}$, $y_{ijk}$, and $z_{ijk}$ may represent $p_{ijk}$'s position in a coordinate frame that may be a sensor coordinate frame or a device coordinate frame or a canonical coordinate frame. The residual $\delta_{ijk}$ can be computed by substituting (10) into (7) and expanding it. This results $$\delta_{ijk} = x_{ijk}R_i^{1,1}n_j^1 + y_{ijk}R_i^{1,2}n_j^1 + z_{ijk}R_i^{1,3}n_j^1 + x_{ijk}R_i^{2,1}n_j^2 + y_{ijk}R_i^{2,2}n_j^2 + z_{ijk}R_i^{2,3}n_j^2 + x_{ijk}R_i^{3,1}n_j^3 + y_{ijk}R_i^{3,2}n_j^3 + z_{ijk}R_i^{3,3}n_j^3 + n_j^1 t_i^1 + n_j^2 t_i^2 + n_j^3 t_i^3 + d_j.$$

(11) may be rewritten as $$\delta_{ijk} = c_{ijk} \cdot v_{ij}, \quad (12)$$

where $c_{ijk}$ and $v_{ij}$ are 13-dimensional vectors as $$c_{ijk} = [x_{ijk}, y_{ijk}, z_{ijk}, x_{ijk}, y_{ijk}, z_{ijk}, x_{ijk}, y_{ijk}, z_{ijk}, 1, 1, 1, 1]^T,$$

$$v_{ij} = [R_i^{1,1}n_j^1, R_i^{1,2}n_j^2, R_i^{1,3}n_j^3, R_i^{1,1}n_j^2, R_i^{2,2}n_j^2, R_i^{2,3}n_j^3, R_i^{3,1}n_j^1, R_i^{3,2}n_j^2, R_i^{3,3}n_j^3, n_j^1 t_i^1, n_j^2 t_i^2, n_j^3 t_i^3, d_j]^T. \quad (13)$$

The elements in $c_{ijk}$ are from the observation $p_{ijk}$ or 1, which are constants. On the other hand, the elements in $v_{ij}$ are functions of $\rho_i$ and $\omega_j$.

The partial derivatives of $\delta_{ijk}$ can be computed by assume that $\rho_i$ has $n_\rho$ unknowns and $\omega_j$ has $n_\omega$ unknowns. It may be defined $$\zeta_{ij} = \begin{bmatrix} \rho_i \\ \omega_j \end{bmatrix} \begin{matrix} \}n_\rho \text{ unknowns} \\ \}n_\omega \text{ unknowns} \end{matrix} \quad (14)$$

Suppose $\zeta_{ij}^d$ is the dth element of $\zeta_{ij}$. According to (12), the partial derivative of $\delta_{ijk}$ with respect to $\zeta_{ij}^d$ has the form as $$\frac{\partial \delta_{ijk}}{\partial \zeta_{ij}^d} = c_{ijk} \cdot \frac{\partial v_{ij}}{\partial \zeta_{ij}^d}, \quad (15)$$

where $$\frac{\partial v_{ij}}{\partial \zeta_{ij}^d}$$

is a 13-dimensional vector whose elements are the partial derivatives of the elements of $v_{ij}$ with respect to $\zeta_{ij}^d$. According to (15), $$\frac{\partial \delta_{ijk}}{\partial \rho_i}$$

has the form as $$\frac{\partial \delta_{ijk}}{\partial \rho_i} = \left[\frac{\partial \delta_{ijk}}{\partial \zeta_{ij}^1}, \cdots, \frac{\partial \delta_{ijk}}{\partial \zeta_{ij}^{n_\rho}}\right] \quad (16)$$

$$= \left[c_{ijk} \cdot \frac{\partial v_{ij}}{\partial \zeta_{ij}^1}, \cdots, c_{ijk} \cdot \frac{\partial v_{ij}}{\partial \zeta_{ij}^{n_\rho}}\right]$$

$$= c_{ijk}^T \underbrace{\left[\frac{\partial v_{ij}}{\partial \zeta_{ij}^1}, \cdots, \frac{\partial v_{ij}}{\partial \zeta_{ij}^{n_\rho}}\right]}_{V_{\rho_i}}$$

$$= c_{ijk}^T V_{\rho_i}.$$

$V_{\rho i}$ may be a 13×6 or 13×7 matrix (13×7 for quaternion and 13×6 for minimal representations of the rotation matrix). Similarly, $$\frac{\partial \delta_{ijk}}{\partial \omega_j}$$

has the form as $$\frac{\partial \delta_{ijk}}{\partial \omega_j} = c_{ijk}^T \underbrace{\left[\frac{\partial v_{ij}}{\partial \zeta_{ij}^{n_\rho+1}}, \cdots, \frac{\partial v_{ij}}{\partial \zeta_{ij}^{n_\rho+n_\omega}}\right]}_{V_{\omega_i}} \quad (17)$$

$$= c_{ijk}^T V_{\omega_j}$$

$V_{\omega j}$ may be a 13×3 or 13×4 matrix (13×3 for minimal representations of a plane and 13×4 for homogeneous coordinates of a plane).

The Jacobian matrix $J_{ij}$ may be computed based on $$C_{ij} = \begin{bmatrix} c_{ij1}^T \\ c_{ij2}^T \\ \vdots \\ c_{ijK_{ij}}^T \end{bmatrix}, \quad (18)$$

where the kth row $c_{ijk}$ is defined in (13). $C_{ij}$ is a matrix of size $K_{ij} \times 13$. The Jacobian matrix $J_{ij}$ may be computed by substituting (16) and (17) into (9) and using the definition of Coin (18). This results $$J_{ij} = \begin{bmatrix} 0 & \cdots & c_{ij1}^T V_{\rho_i} & \cdots & 0 & \cdots & c_{ij1}^T V_{\omega_j} & \cdots & 0 \\ 0 & \cdots & c_{ij2}^T V_{\rho_i} & \cdots & 0 & \cdots & c_{ij2}^T V_{\omega_j} & \cdots & 0 \\ \vdots & \ddots & \vdots & \ddots & \vdots & \ddots & \vdots & \ddots & \vdots \\ 0 & \cdots & \underbrace{c_{ijK_{ij}}^T V_{\rho_i}}_{C_{ij}V_{\rho_i}} & \cdots & 0 & \cdots & \underbrace{c_{ijK_{ij}}^T V_{\omega_j}}_{C_{ij}V_{\omega_j}} & \cdots & 0 \end{bmatrix} \quad (19)$$

$$= [0 \cdots C_{ij}V_{\rho_i} \cdots 0 \cdots C_{ij}V_{\omega_j} \cdots 0],$$

Suppose $P_{1j}$ is the measurements from the jth plane $\omega_j$ at the first pose $\rho_1$. As $\rho_1$ may be fixed during the optimization, the Jacobian matrix $J_{1j}$ derived from $P_{1j}$ may have the form as $$J_{1j} = [0 \ldots 0 \ldots 0 \ldots C_{1j}V_{\omega_j} \ldots 0] \quad (20)$$

$C_{ij}$ can be written in the form as $$C_{ij} = Q_{ij}M_{ij}, \quad (21)$$

where $M_{ij}$ is of the size 4×13 and $Q^T_{ij}Q_{ij}=I_4$, where $I_4$ is the 4×4 identity matrix. As shown in the definition of $c_{ijk}$ in (13), $x_{ijk}$, $y_{ijk}$, $z_{ijk}$ and 1 are duplicated several times to form $c_{ijk}$. Therefore, there are only 4 individual columns among the 13 columns of $C_{ij}$, which contains the constant 1 and the x, y, z coordinates of points within $P_{ij}$. It is denoted as $$E_{ij} = \begin{bmatrix} x_{ij1} & y_{ij1} & z_{ij1} & 1 \\ x_{ij2} & y_{ij2} & z_{ij2} & 1 \\ \vdots & \vdots & \vdots & \vdots \\ \frac{xijK_{ij}}{x_{ij}} & \frac{y_{ijK_{ij}}}{y_{ij}} & \frac{z_{ijK_{ij}}}{z_{ij}} & \frac{1}{1} \end{bmatrix} \quad (22)$$

$$= [x_{ij} \; y_{ij} \; z_{ij} \; 1]$$

The 13 columns in the $C_{ij}$ are copies of the 4 columns in $E_{ij}$. $E_{ij}$ can be factorized as $$E_{ij}=Q_{ij}U_{ij} \quad (23)$$

where $Q^T_{ij}Q_{ij}=I_4$ and $U_{ij}$ is an upper triangular matrix. $Q_{ij}$ is of the size $K_{ij}\times 4$ and $U_{ij}$ is of the size 4×4. The thin QR decomposition may be used since the number of points $K_{ij}$ is generally much larger than 4. The thin QR decomposition can reduce computational time. $U_{ij}$ can be partitioned by its columns as $$U_{ij}=[u_{ij}^1 u_{ij}^2 u_{ij}^3 u_{ij}^4]. \quad (24)$$

Substituting (24) into (22) results $$E_{ij}=Q_{ij}[u_{ij}^1 u_{ij}^2 u_{ij}^3 u_{ij}^4] \quad (25)$$

Comparing (22) and (23) results $$x_{ij}=Q_{ij}u_{ij}^1, y_{ij}=Q_{ij}u_{ij}^2,$$

$$z_{ij}=Q_{ij}u_{ij}^3, 1=Q_{ij}u_{ij}^4, \quad (26)$$

As the columns of $C_{ij}$ are a copy of the columns of $E_{ij}$, according to the form of $c_{ijk}$ in (13) and the definition of $E_{ij}$ in (22), $C_{ij}$ can be written as $$C_{ij}=[x_{ij},y_{ij},z_{ij},x_{ij},y_{ij},z_{ij},x_{ij},y_{ij},z_{ij},1,1,1,1] \quad (27)$$

Substituting (26) into (27) results $$C_{ij} = Q_{ij}\underbrace{[u_{ij}^1, u_{ij}^2, u_{ij}^3, u_{ij}^1, u_{ij}^2, u_{ij}^3, u_{ij}^1, u_{ij}^2, u_{ij}^3, u_{ij}^4, u_{ij}^4, u_{ij}^4, u_{ij}^4]}_{M_{ij}} \quad (28)$$

$$= Q_{ij}M_{ij}$$

The factorization of $C_{ij}$ can be used to significantly reduce the computational cost. Although the thin QR decomposition is described in the example, other factorization methods may be used including, for example, singular value decomposition (SVD).

A reduced Jacobian matrix $J^r_{ij}$ of $J_{ij}$ may be computed based on $C_{ij}$, which may be factorized as $C_{ij}=Q_{ij}M_{ij}$ as described above.

$$J^r_{ij} = \begin{cases} [0 \cdots 0 \cdots 0 \cdots M_{1j}V_{\omega_j} \cdots 0] & i=1 \\ [0 \cdots M_{ij}V_{\rho_i} \cdots 0 \cdots M_{ij}V_{\omega_j} \cdots 0] & i \neq 1 \end{cases} \quad (29)$$

The reduced Jacobian matrix $J^r_{ij}$ has fewer rows than the Jacobian matrix $J_{ij}$, because $M_{ij}$ is a much smaller matrix than $C_{ij}$. $C_{ij}$ has the size $K_{ij}\times 13$. In contrast, $M_{ij}$ has the size 4×13. Generally, $K_{ij}$ is much larger than 4.

$J_{ij}$ and $J^r_{ij}$ may be stacked to form the Jacobian matrix J and the reduced Jacobian matrix $J^r$ for the cost function (8), as $$J = \begin{bmatrix} \vdots \\ J_{ij} \\ \vdots \end{bmatrix}, J^r = \begin{bmatrix} \vdots \\ J^r_{ij} \\ \vdots \end{bmatrix}, \quad (30)$$

$J^r$ can replace J to calculate $J^TJ$ in the algorithm that solves least-squares problem. For the planar bundle adjustment, $J^TJ=J^{rT}J^r$. J and $J^r$ are block vectors in terms of $J_{ij}$ and $J^r_{ij}$ as defined in (30). According to block matrix multiplication, $$J^TJ=\Sigma_{i,j}J^T_{ij}J_{ij}, J^{rT}J^r=\Sigma_{i,j}J^{rT}_{ij}J^r_{ij} \quad (31)$$

For $i\neq 1$, using the expression in (19), $J^T_{ij}J_{ij}$ has the form $$J^T_{ij}J_{ij} = \begin{bmatrix} 0 & \cdots & 0 & \cdots & 0 & \cdots & 0 \\ 0 & \cdots & V^T_{\rho_i}C^T_{ij}C_{ij}V_{\rho_j} & \cdots & V^T_{\rho_i}C^T_{ij}C_{ij}V_{\omega_j} & \cdots & 0 \\ \vdots & & \vdots & & \vdots & & \vdots \\ 0 & \cdots & V^T_{\omega_j}C^T_{ij}C_{ij}V_{\rho_i} & \cdots & V^T_{\omega_j}C^T_{ij}C_{ij}V_{\omega_j} & \cdots & 0 \\ \vdots & & \vdots & & \vdots & & \vdots \\ 0 & \cdots & 0 & \cdots & 0 & \cdots & 0 \end{bmatrix} \quad (32)$$

Similarly, using the expression in (29), $J^{rT}_{ij}J^r_{ij}$ has the form $$J^{rT}_{ij}J^r_{ij} = \begin{bmatrix} 0 & \cdots & 0 & \cdots & 0 & \cdots & 0 \\ \vdots & & \vdots & & \vdots & & \vdots \\ 0 & \cdots & V^T_{\rho_i}M^T_{ij}M_{ij}V_{\rho_j} & \cdots & V^T_{\rho_i}M^T_{ij}M_{ij}V_{\omega_j} & \cdots & 0 \\ \vdots & & \vdots & & \vdots & & \vdots \\ 0 & \cdots & V^T_{\omega_j}M^T_{ij}M_{ij}V_{\rho_i} & \cdots & V^T_{\omega_j}M^T_{ij}M_{ij}V_{\omega_j} & \cdots & 0 \\ \vdots & & \vdots & & \vdots & & \vdots \\ 0 & \cdots & 0 & \cdots & 0 & \cdots & 0 \end{bmatrix} \quad (33)$$

Substituting (21) into $V^T_{\rho_i}C^T_{ij}C_{ij}V_{\rho_i}$ and using the fact $Q^T_{ij}Q_{ij}=I_4$, $$V^T_{\rho_i}C^T_{ij}C_{ij}V_{\rho_i} = V^T_{\rho_i}M^T_{ij}(Q^T_{ij}Q_{ij})M_{ij}V_{\rho_i} \quad (34)$$

$$= V^T_{\rho_i}M^T_{ij}M_{ij}V_{\rho_i}$$

Similarly, $$V^T_{\rho_i}C^T_{ij}C_{ij}V_{\omega_j}=V^T_{\rho_i}M^T_{ij}M_{ij}V_{\omega_j}$$

$$V^T_{\omega_j}C^T_{ij}C_{ij}V_{\rho_i}=V^T_{\omega_j}M^T_{ij}M_{ij}V_{\rho_i}$$

$$V^T_{\omega_j}C^T_{ij}C_{ij}V_{\omega_j}=V^T_{\omega_j}M^T_{ij}M_{ij}V_{\omega_j} \quad (35)$$

For i=1, according to (20), the only non-zero term for $J^T_{1j}J_{1j}$ is $V^T_{\omega_j}C^T_{1j}C_{1j}V_{\omega_j}$. On the other hand, according to (29), $J^{rT}_{ij}J^r_{ij}$ has only one corresponding non-zero term $V^T_{\omega_j}M^T_{1j}M_{1j}V_{\omega_j}$. Similar to the derivation in (34), we have $$V^T_{\omega_j}C^T_{1j}C_{1j}V_{\omega_j}=V^T_{\omega_j}M^T_{1j}M_{1j}V_{\omega_j}. \quad (36)$$

In summary, using (34), (35) and (36), $J^T_{ij}J_{ij}=J^{rT}_{ij}J^r_{ij}$. According to (31), consequently $J^TJ=J^{rT}J^r$.

The residual vector for the $K_{ij}$ points in $P_{ij}$ can be defined as $\delta_{ij}=[\delta_{ij1},\delta_{ij2},\ldots\delta_{ijK_{ij}}]^T$. According to (12), $\delta_{ij}$ can be written as $$\delta_{ij}=C_{ij}v_{ij}. \quad (37)$$

A reduced residual vector $\delta^r_{ij}$ of $\delta_{ij}$ can be defined as $$\delta_{ij}{}^r=M_{ij}v_{ij} \quad (38)$$

Stacking all $\delta_{ij}$ and $\delta^r_{ij}$, the residual vector $\delta$ and the reduced residual vector $\delta^r$ have the forms as $$\delta = \begin{bmatrix} \vdots \\ \delta_{ij} \\ \vdots \end{bmatrix}, \delta^r = \begin{bmatrix} \vdots \\ \delta^r_{ij} \\ \vdots \end{bmatrix}, \quad (39)$$

The reduced residual vector $\delta^r$ can replace the residual vector $\delta$ in the algorithm that solves least-squares problem. For the planar bundle adjustment, $J^T\delta=J^{rT}\delta^r$. J, J$^r$, $\delta$ and $\delta^r$ are block vectors with elements $J_{ij}$, $J^r_{ij}$, $\delta_{1j}$ and $\delta^r_{ij}$ as defined in (30) and (39), respectively. Applying the block matrix multiplication, $$J^T\delta=\Sigma_{i,j}J_{ij}{}^T\delta_{ij},J^{rT}\delta^r=\Sigma_{i,j}J_{ij}^{rT}\delta_{ij}^r \quad (40)$$

For i≠1, using the expression of $J_{ij}$ in (19) and $J^r_{ij}$ in (29), and the expression of $\delta_{ij}$ in (37) and $\delta^r_{ij}$ in (38), $J^T_{ij}\delta_{ij}$ and $J^{rT}_{ij}\delta^r_{ij}$ have the forms as $$J_{ij}^T\delta_{ij} = \begin{bmatrix} 0 \\ \vdots \\ V_{\rho_{ij}}^T C_{ij}^T C_{ij} v_{ij} \\ \vdots \\ V_{\omega_{ij}}^T C_{ij}^T C_{ij} v_{ij} \\ \vdots \\ 0 \end{bmatrix}, J_{ij}^{rT}\delta_{ij}^r = \begin{bmatrix} 0 \\ \vdots \\ V_{\rho_{ij}}^T M_{ij}^T M_{ij} v_{ij} \\ \vdots \\ V_{\omega_{ij}}^T M_{ij}^T M_{ij} v_{ij} \\ \vdots \\ 0 \end{bmatrix} \quad (41)$$

Substituting (21) into $V^T_{p\ ij}C^r_{i\ ij}C_{ij}$ and using the fact $Q^T_{ij}Q_{ij}=I_4$, $$V_{\rho_i}^T C_{ij}^T C_{ij} v_{ij} = V_{\rho_i}^T M_{ij}^T (Q_{ij}^T Q_{ij}) M_{ij} v_{ij} \quad (42)$$
$$= V_{\rho_i}^T M_{ij}^T M_{ij} v_{ij}$$

Similarly, $$V_{\omega_{ij}}{}^T C_{ij}{}^T C_{ij} v_{ij} = V_{\omega_{ij}}{}^T M_{ij}{}^T M_{ij} v_{ij} \quad (43)$$

For i=1, substituting (20) and (37) into $J^T_{1j}\delta_{ij}$ and applying the block matrix multiplication, the only non-zero term of $J^T_{1j}\delta_{1j}$ is $V_{\omega 1j}{}^T C_{1j}{}^T C_{1j} v_{1j}$. On the other hand, substituting (29) and (38) into $J^{rT}_{1j}\delta^r_{1j}$, $J^{rT}_{1j}\delta^r_{1j}$ only has one non-zero term $V^T_{\omega 1j}M^T_{1j}M_{1j}v_{1j}$. Similar to the derivation in (42), $$V_{\omega 1j}{}^T C_{1j}{}^T C_{1j} v_{1j} = V_{\omega 1j}{}^T M_{1j}{}^T M_{1j} v_{1j} \quad (44)$$

In summary, from (42), (43) and (44), $J^T_{ij}\delta_{ij}=J^{rT}_{ij}\delta^r_{ij}$. According to (40), $J^T\delta=J^{rT}\delta^r$.

It should be appreciated that, in some embodiments a system using a reduced Jacobean matrix may compute the reduced Jacobean matrix directly from sensor data or other information, without forming the Jacobean matrix or repeating the computations to arrive at the form of the reduced matrix described herein.

For the planar bundle adjustment, the reduced Jacobian matrix J$^r$ and the reduced residual vector $\delta^r$ can replace J and $\delta$ in (4) to compute the step in the algorithm that solves least-squares problem, and each block $J^r_{ij}$ and $\delta_{ij}r$ in J$^r$ and $\delta^r$ have 4 rows. The algorithm that solves least-squares problem uses (4) to calculate the step for each iteration. As $J^TJ=J^{rT}J^r$, $J^T\delta=J^{rT}\delta$, $(J^{rT}J^r+\lambda I)\xi=J^{rT}\delta$ is equivalent to $(J^TJ+\lambda I)\xi=J^T\delta$. Thus, J$^r$ and $\delta^r$ can replace J and $\delta$ for computing the step in the algorithm that solves least-squares problem. According to the definition of $J^r_{ij}$ in (29) and $\delta^r_{ij}$ in (38), the number of rows of $J^r_{ij}$ and $\delta^r_{ij}$ is the same as the number of rows of $M_{ij}$, which has 4 rows. Consequently, J$^r$ and $\delta^r$ have 4 rows. Therefore, no matter how may points are in Pij, the reduced $J^r_{ij}$ and $\delta^r_{ij}$ have at most 4 rows. This significantly reduces the computational cost in the algorithm that solves least-squares problem. The additional cost here is to calculate $C_{ij}=Q_{ij}M_{ij}$. As $C_{ij}$ keeps constant during the iteration, it is computed for a single time before the iteration.

In some embodiments, a planar bundle adjustment may obtain initial predictions of N poses and M plane parameters, and the measurements $\{P_{ij}\}$. The planar bundle adjustment may compute a matrix block $c_{ijk}$ for each $p_{ijk}\in P_{ij}$ as (11), and stacking the matrix blocks to $C_{ij}$ as (16). The planar bundle adjustment may factorize $C_{ij}$ into an orthogonal matrix $Q_{ij}$ and an upper triangular matrix $M_{ij}$ as (19). The upper triangular matrix $M_{ij}$ may be provided to an algorithm that solves least-squares problem (e.g., the Levenberg-Marquardt (LM) algorithm, and the Gaussian-Newton algorithm) to compute the reduced Jacobian matrix block $J^r_{ij}$ in (27) and the reduced residual block $\delta^r_{ij}$ in (36), which may be stacked to form the reduced Jacobian matrix J$^r$ as (28) and the reduced residual vector $\delta^r$ as (37). The algorithm that solves least-squares problem may compute refined poses and plane parameters until converging.

In some embodiments, planar features may be combined in 3D reconstruction with other features such as point features. In the combined cost function derived from multiple features, the Jacobian matrix from the plane cost would have the form as J in (28), and the residual vector also has the form as $\delta$ in (37). Therefore, the reduced Jacobian matrix J$^r$ in (28) and the reduced residual vector $\delta$ in (37) may replace the Jacobian matrix and the original residual vector in a bundle adjustment with hybrid features.

Figure 9:
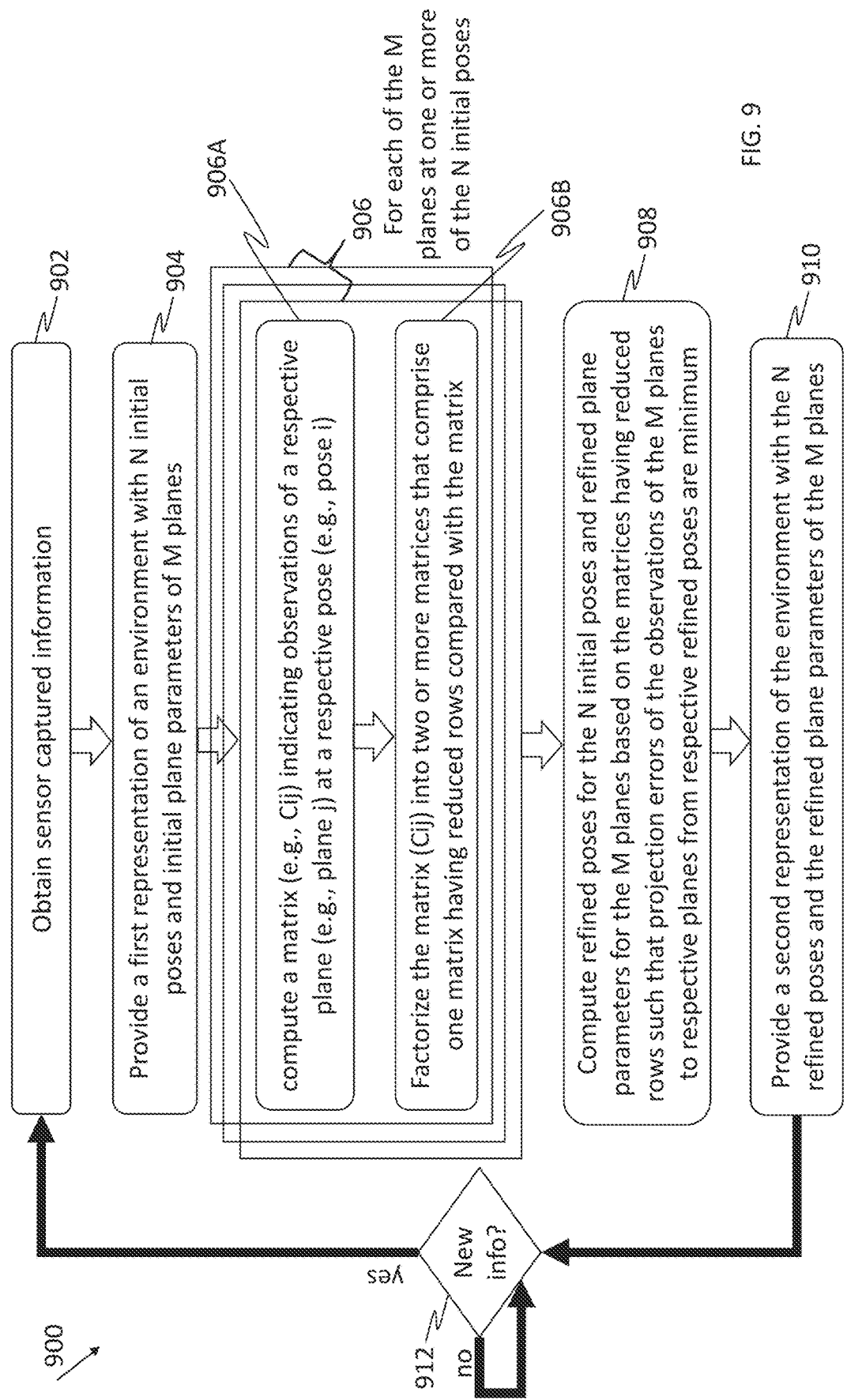
FIG. 9 is a flow chart illustrating a method of providing a representation of an environment, according to some embodiments.
Figure 10:
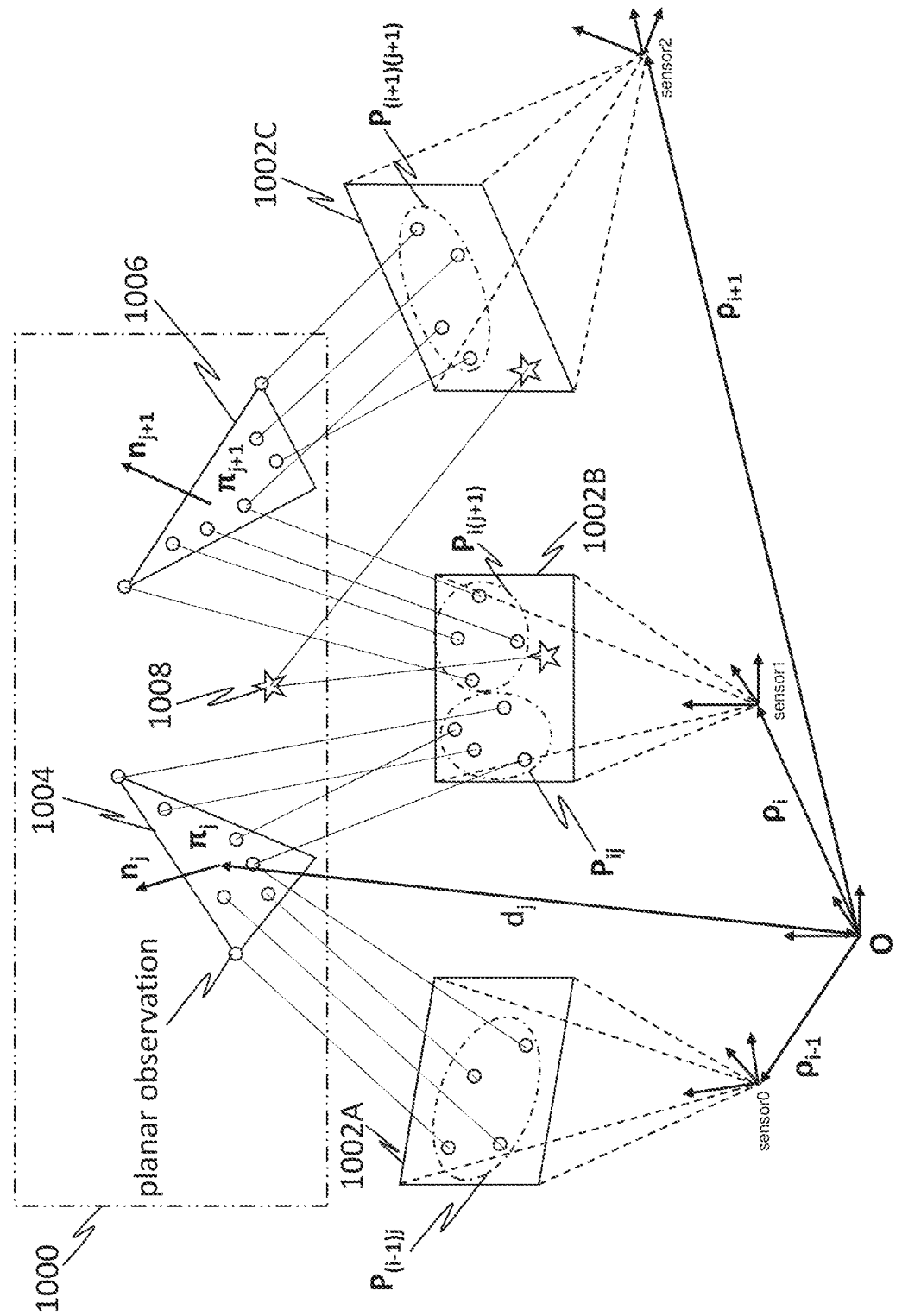
FIG. 10 is a schematic diagram illustrating a portion of a representation of an environment computed based on sensor captured information using the method of FIG. 9, according to some embodiments.

Representations of environments may be computed with planar bundle adjustment. FIG. 9 is a flow chart illustrating a method 900 of providing a representation of an environment, according to some embodiments. FIG. 10 is a schematic diagram illustrating a portion 1000 of a representation of an environment computed based on sensor captured information using the method 900, according to some embodiments.

The method 900 may start by obtaining (Act 902) information captured by one or more sensors at respective poses. In some embodiments, the obtained information may be visual images and/or depth images. In some embodiments, an image may be a keyframe that may be a combination of multiple images. The example of FIG. 10 shows three sensors sensor0, sensor1, and sensor2. In some embodiments, the sensors may belong to a device, which may have a device coordinate frame with an origin O. The device coordinate frame may represent the location and the orientation when the device first initiates scanning the environment for this session. Each sensor may have a corresponding sensor coordinate frame. Each sensor may capture one or more images such as images 1002A, 1002B, 1002C at respective poses $\rho_{i-1}$, $\rho_i$, and $\rho_{i+1}$. In some embodiments, the coordinate frame with origin O may represent a shared coordinate frame by one or more devices. For example, the sensors may belong to three devices that share the coordinate frame.

The method 900 may include providing (Act 904) a first representation of an environment. The first representation may include initial predictions of feature parameters for features extracted from the sensor captured information and initial predictions of corresponding poses. In the example of FIG. 10, a first plane 1004 is observed in image 1002A and image 1002B. The first plane 1004 may be represented by plane parameters $\pi_j=[n_j; d_j]$. Image 1002A and image 1002B observe multiple points $P_{(i-1)j}$ and $P_{ij}$ in the plane 1004, respectively. Portions of the first plane 1004 may be observed by both image 1002A and 1002B. Portions of the first plane 1004 may be observed by only image 1002A or only 1002B. A second plane 1006 is observed in image 1002B and image 1002C. The second plane 1006 may be represented by plane parameters $\pi_{j+1}=[n_{(j+1)}; d_{(j+1)}]$. Image 1002B and image 1002C observe multiple points $P_{i(j+1)}$ and $P_{(i+1)j}$ in the plane 1006, respectively. Portions of the second plane 1006 may be observed by both image 1002B and 1002C. Portions of the second plane 1006 may be observed by only image 1002B or only 1002C. Image 1002B and image 1002C also observe a point feature 1008. The first representation may include initial predictions of the poses $\rho_{i-1}$, $\rho_i$, and $\rho_{i+1}$, plane parameters for the first plane 1004 and the second plane 1006, and point feature parameters for the point feature 1008.

The initial predictions may be based on the images that first observe the features. For the example of FIG. 10, the initial predictions of the pose $\rho_{i-1}$ and plane parameters for the first plane 1004 may be based on image 1002A. The initial predictions of the pose $\rho_i$, plane parameters for the second plane 1006, and feature parameters for the point feature 1008 may be based on image 1002B. The initial predictions of the pose $\rho_{i+1}$ may be based on image 1002C.

As the features are observed by subsequent images, the initial predictions may be refined to reduce drift and improve the quality of the presentation. The method 900 may include Act 906 and Act 908 to compute refined poses and refined feature parameters, which may include refined plane parameters and refined point feature parameters. Act 906 may be performed for each of the planes at corresponding poses. In the example of FIG. 10, Act 906 is performed for the first plane 1004 at poses $\rho_{i-1}$ and $\rho_i$, respectively. Act 906 is also performed for the second plane 1006 at poses $\rho_i$ and $\rho_{i+1}$, respectively. Act 906 may include computing (Act 906A) a matrix (e.g., $C_{ij}$ as (16)) that indicates observations of a respective plane (e.g., plane j) at a respective pose (e.g., pose i). Act 906 may include factorizing (Act 906B) the matrix into two or more matrices that comprise one matrix having reduced rows compared with the matrix (e.g., an upper triangular matrix $M_{ij}$ as (19)).

The method 900 may include providing (Act 910) a second representation of the environment with the refined poses and refined feature parameters. The method 900 may include determining (Act 912) whether new information are observed such that Acts 902 to 910 should be repeated.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, in VR environments, and any other computer vision and robotics applications.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

Such alterations, modifications, and improvements are intended to be part of this disclosure, and are intended to be within the spirit and scope of the disclosure. Further, though advantages of the present disclosure are indicated, it should be appreciated that not every embodiment of the disclosure will include every described advantage. Some embodiments may not implement any features described as advantageous herein and in some instances. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. In some embodiments, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. In some embodiments, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a computer-readable medium that can be considered to be a manufacture (i.e., article of manufacture) or a machine. In some embodiments, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing system to generate a representation of an environment, the method comprising:
    obtaining sensor captured information, the sensor captured information comprising a plurality of images;
    providing an initial representation of the environment, the initial representation comprising N initial poses and initial parameters of M planar features based at least in part on the plurality of images, the initial parameters of the M planar features indicating normals of planes represented by the M planar features;
    for each of the M planar features at each pose corresponding to an image of the plurality of images comprising one or more observations of the planar feature:
        computing a matrix indicating the one or more observations of the planar feature, and
        factorizing the matrix into two or more matrices, the two or more matrices comprising one matrix having reduced rows compared with the matrix; and
    computing N refined poses and refined parameters of the M planar features by jointly adjusting the N initial poses and the initial parameters of the M planar features based at least in part on the matrices having reduced rows,
    wherein the representation of the environment comprises N refined poses and the refined parameters of the M planar features.

2. The method of claim 1, wherein for each of the M planar features at each pose corresponding to an image of the plurality of images comprising one or more observations of the planar feature:
    factorizing the matrix into two or more matrices comprises computing an orthogonal matrix and an upper triangular matrix.

3. The method of claim 2, wherein computing the N refined poses and refined parameters of the M planar features is based at least in part on the upper triangular matrices.

4. The method of claim 1, wherein computing the N refined poses and refined parameters of the M planar features based at least in part on the matrices having reduced rows comprises
    computing reduced Jacobian matrix blocks based at least in part on the matrices having reduced rows.

5. The method of claim 4, wherein computing the N refined poses and refined parameters of the M planar features based at least in part on the matrices having reduced rows comprises
    stacking the reduced Jacobian matrix blocks to form a reduced Jacobian matrix.

6. The method of claim 5, wherein computing the N refined poses and refined parameters of the M planar features based at least in part on the matrices having reduced rows comprises
    providing the reduced Jacobian matrix to an algorithm that solves least-squares problem to update current estimate of the N refined poses and refined parameters of the M planar features.

7. The method of claim 1, wherein computing the N refined poses and refined parameters of the M planar features based at least in part on the matrices having reduced rows comprises
    computing reduced residual blocks based at least in part on the matrices having reduced rows.

8. The method of claim 7, wherein computing the N refined poses and refined parameters of the M planar features based at least in part on the matrices having reduced rows comprises
    stacking the reduced residual blocks to form a reduced residual vector.

9. The method of claim 8, wherein computing the N refined poses and refined parameters of the M planar features based at least in part on the matrices having reduced rows comprises
    providing the reduced residual vector to an algorithm that solves least-squares problem to update current estimate of the N refined poses and refined parameters of the M planar features.

10. The method of claim 1, wherein for each of the M planar features at each pose corresponding to an image of the plurality of images comprising one or more observations of the planar feature, computing the matrix indicating the one or more observations of the planar feature comprises
    for each of the one or more observations of the planar feature, computing a matrix block indicating said observation, and
    stacking the matrix blocks into the matrix indicating the one or more observations of the planar feature.

11. A method of operating a computing system to generate a representation of an environment, the method comprising:
    obtaining sensor captured information, the sensor captured information comprising a plurality of images;
    providing an initial representation of the environment, the initial representation comprising N initial poses and initial parameters of M planar features based at least in part on the plurality of images, the initial parameters of the M planar features indicating normals of planes represented by the M planar features;
    for each of the M planar features at each pose corresponding to an image of the plurality of images comprising one or more observations of the planar feature:
        computing a matrix having P rows, P being less than a number of the one or more observations of the planar feature; and
    computing N refined poses and refined parameters of the M planar features by jointly adjusting the N initial poses and the initial parameters of the M planar features based at least in part on the matrices having P rows,
    wherein the representation of the environment comprises the N refined poses and the refined parameters of the M planar features.

12. The method of claim 11, wherein for each of the M planar features at each pose corresponding to an image of the plurality of images comprising one or more observations of the planar feature, computing the matrix having P rows comprises
    computing a matrix indicating the one or more observations of the planar feature, and
    factorizing the matrix into two or more matrices, the two or more matrices comprising the matrix having P rows.

13. The method of claim 12, wherein factorizing the matrix into two or more matrices comprises computing an orthogonal matrix and an upper triangular matrix.

14. The method of claim 12, wherein for each of the M planar features at each pose corresponding to an image of the plurality of images comprising one or more observations of the planar feature, computing the matrix indicating the one or more observations of the planar feature comprises
    for each of the one or more observations of the planar feature, computing a matrix block indicating said observation, and
    stacking the matrix blocks into the matrix indicating the one or more observations of the planar feature.

15. The method of claim 11, wherein computing the N refined poses and refined parameters of the M planar features based at least in part on the matrices having P rows comprises
    computing reduced Jacobian matrix blocks based at least in part on the matrices P rows.

16. The method of claim 15, wherein computing the N refined poses and refined parameters of the M planar features based at least in part on the matrices P rows comprises
    stacking the reduced Jacobian matrix blocks to form a reduced Jacobian matrix.

17. The method of claim 16, wherein computing the N refined poses and refined parameters of the M planar features based at least in part on the matrices having P rows comprises
    providing the reduced Jacobian matrix to an algorithm that solves least-squares problem to update current estimate of the N refined poses and refined parameters of the M planar features.

18. The method of claim 11, wherein computing the N refined poses and refined parameters of the M planar features based at least in part on the matrices having P rows comprises
    computing reduced residual blocks based at least in part on the matrices having P rows.

19. The method of claim 18, wherein computing the N refined poses and refined parameters of the M planar features based at least in part on the matrices having P rows comprises stacking the reduced residual blocks to form a reduced residual vector.

20. The method of claim 19, wherein computing the N refined poses and refined parameters of the M planar features based at least in part on the matrices having P rows comprises providing the reduced residual vector to an algorithm that solves least-squares problem to update current estimate of the N refined poses and refined parameters of the M planar features.

* * * * *